(12) United States Patent
Tsunoda et al.

(10) Patent No.: US 7,765,250 B2
(45) Date of Patent: Jul. 27, 2010

(54) DATA PROCESSOR WITH INTERNAL MEMORY STRUCTURE FOR PROCESSING STREAM DATA

(75) Inventors: Takanobu Tsunoda, Kokubunji (JP); Bryan Atwood, Tokyo (JP); Masashi Takada, Kokubunji (JP); Hiroshi Tanaka, Kokubunji (JP)

(73) Assignee: Renesas Technology Corp., Tokyo (JP)

( * ) Notice: Subject to any disclaimer, the term of this patent is extended or adjusted under 35 U.S.C. 154(b) by 1108 days.

(21) Appl. No.: 11/271,961

(22) Filed: Nov. 14, 2005

(65) Prior Publication Data
US 2006/0190701 A1 Aug. 24, 2006

(30) Foreign Application Priority Data
Nov. 15, 2004 (JP) ............................. 2004-330430
Jun. 22, 2005 (JP) ............................. 2005-181663

(51) Int. Cl.
*G06F 7/38* (2006.01)
(52) U.S. Cl. ...................................................... 708/230
(58) Field of Classification Search ................. 708/230
See application file for complete search history.

(56) References Cited

U.S. PATENT DOCUMENTS

| 4,829,420 | A | | 5/1989 | Stahle |
| 5,388,230 | A | * | 2/1995 | Yamada et al. ............... 710/316 |
| 5,535,406 | A | * | 7/1996 | Kolchinsky .................. 712/10 |
| 5,584,010 | A | | 12/1996 | Kawai et al. |
| 5,959,689 | A | | 9/1999 | De Lange et al. |
| 6,076,152 | A | | 6/2000 | Huppenthal et al. |
| 6,119,181 | A | | 9/2000 | Vorbach et al. |
| 6,469,540 | B2 | | 10/2002 | Nakaya |
| 6,526,430 | B1 | | 2/2003 | Hung et al. |
| 6,738,891 | B2 | | 5/2004 | Fujii et al. .................... 712/16 |
| 6,968,442 | B2 | * | 11/2005 | Maeda et al. ................. 712/11 |
| 7,237,087 | B2 | | 6/2007 | Vorbach et al. |
| 2001/0052793 | A1 | | 12/2001 | Nakaya |
| 2003/0056075 | A1 | | 3/2003 | Schmisseur et al. |
| 2004/0001296 | A1 | | 1/2004 | Saito et al. .................. 361/115 |
| 2004/0054869 | A1 | | 3/2004 | Igarashi |
| 2004/0083399 | A1 | | 4/2004 | Vorbach et al. |
| 2004/0215865 | A1 | | 10/2004 | Arimilli et al. |
| 2004/0236929 | A1 | | 11/2004 | Akita |
| 2006/0101232 | A1 | | 5/2006 | Takada et al. |

FOREIGN PATENT DOCUMENTS

| JP | 62-134754 | 6/1987 |
| JP | H05-053902 | 3/1993 |
| JP | H10-506492 | 6/1998 |
| JP | H10-256383 | 9/1998 |

(Continued)

*Primary Examiner*—Tan V Mai
(74) *Attorney, Agent, or Firm*—Miles & Stockbridge P.C.

(57) ABSTRACT

There is provided at least one processor block including a plurality of load store interfaces (801, 804), a plurality of memory banks (821), an input/output port having at least one of an input port (850) and an output port (860), and a crossbar switch (810), and the crossbar switch connects the load store interface, the memory bank and the input/output port to each other and the load store interface constitutes a data processor in order to control a data transfer to the memory bank. Consequently, there is implemented a data processor having a high transfer throughput and a flexibility and efficiently treating stream data.

24 Claims, 28 Drawing Sheets

FOREIGN PATENT DOCUMENTS

| | | |
|---|---|---|
| JP | 11-110215 | 4/1999 |
| JP | 2001-236496 | 8/2001 |
| JP | 2001-312481 | 11/2001 |
| JP | 2002-076883 | 3/2002 |
| JP | 2002-182975 | 6/2002 |
| JP | 2003-532224 | 10/2003 |
| JP | 2004-40188 | 2/2004 |
| JP | 2004-326808 | 11/2004 |
| JP | 2004-334361 | 11/2004 |
| JP | 2005-276854 | 10/2005 |
| WO | WO 03/009125 A1 | 1/2003 |

* cited by examiner

FIG. 11

| INST | REQFRM | | ACKFRM | | |
|------|--------|--------|--------|--------|--------|
| SLOD | 100 | LODADRS | NON | 1 | NON | LODDAT |
| SSTR | 101 | STRADRS | STRDAT | 1 | NON | NON |
| PLOD | 110 | LODADRS0 | LODADRS1 | 1 | LODDAT0 | LODDAT1 |

DATA PROCESSOR WITH INTERNAL MEMORY STRUCTURE FOR PROCESSING STREAM DATA

CLAIMS OF PRIORITY

The present application claims priority from Japanese application JP 2004-330430 filed on Nov. 15, 2004 and JP 2005-181663 filed on Jun. 22, 2005, the content of which is hereby incorporated by reference into this application.

FIELD OF THE INVENTION

The present invention relates to a data processor and more particularly to a data processor in which a function and a connection of a plurality of calculating units disposed are dynamically reconfigurable by software, for example, an effective technique applied to a flexible processor.

BACKGROUND OF THE INVENTION

Portable information apparatuses including a multimedia processing function such as an image or a voice and wire and radio communicating functions have generally been utilized widely, and an enhancement in performance, an improvement in a function and a reduction in a consumed power in a data processor have been required in order to provide these apparatuses inexpensively in small sizes. On the other hand, a quick correspondence to various specifications and standards decided together with the progress of a development of a technology greatly depends on the value of a product. Therefore, the function can easily be changed or added by software after the manufacture of the apparatus so that it is possible to shorten a product development period, and furthermore, to prolong the lifetime of the product.

As first means for implementing the data processor, there is a method of designing a dedicated logical circuit capable of carrying out a prepared and limited change in the function as in a plurality of operating modes and mounting a dedicated LSI combining them. The dedicated LSI can be generally supposed to be the most excellent implementing means in respect of an achievement of an enhancement in a performance and a reduction in a consumed power. However, the method is selected as the implementing means with difficulty because the function can neither changed nor added until the dedicated LSI is not designed again and a long development period is required for the design.

As second means, there is a method of mounting a general-purpose microprocessor and implementing various processings by software including a serial instruction string to be executed over the processor. In this case, it is possible to modify or add the software, thereby enhancing a function and changing and adding the function without varying the hardware of a data processor. Also in a leading edge microprocessor, however, several instructions can be executed at the same time. In order to implement a processing having a high throughput in a data processor based on a sequential processing of an instruction, it is necessary to mount a processor to be operated at a very high clock frequency. Consequently, a consumed power is increased. In order to bring out the processing performance of the processor, furthermore, a control logic other than a calculation, for example, a branch prediction is required. Consequently, there is a drawback that a logic scale of a calculator body is relatively reduced, resulting in a decrease in a processing efficiency for the hardware scale.

As more actual implementing means corresponding to the middle of these two means, in recent years, attention has been paid to a reconfigurable LSI which is referred to as a Field Programmable Gate Array (FPGA) and a coverage has been enlarged gradually. The FPGA has an internal structure in which a large number of Lookup Tables (LUTs) are connected to each other through a bus having a path which can be changed and has a feature that the contents of the operation of the LUT and configuration data for defining a connection between the LUTs are read from a memory attached externally to the LSI and an optional function can be thus implemented in the LSI. Basically, the contents of the operation of the LUT and the connection between the LUTs can be set on a 1-bit unit. Therefore, a flexibility is high in the implementation of a predetermined function over the LSI. On the other hand, there is a problem in that an area overhead is great in an application field in which a multibit calculation such as an image and voice processing is mainly carried out.

In consideration of such a technical background, there has been well-known a flexible processor technique which comprises a calculator for setting a calculation of a fineness degree in a width of approximately 8 to 32 bits to be a unit and is intended for balancing a calculating performance with a flexibility in a high dimension, and the same technique has been described in Patent Document 1 (JP-A-2001-312481 Publication) and Patent Document 2 (JP-A-2004-040188 Publication), for example. The FPGA has a logical gate of an NAND or NOR circuit disposed in an array and a connection wiring thereof is switched. On the other hand, in the flexible processor technique, a calculating unit is disposed in an array in place of the logical gate, and a function of the calculating unit and a wiring between the calculating units are switched based on configuration data.

SUMMARY OF THE INVENTION

The inventor investigated the flexible processor technique in respect of a practicability, thereby finding the following problems to be solved.

Referring to a data processing performance utilizing a flexible processor, first of all, a processing overhead with a data transfer generated before and after a data processing is to be particularly taken into consideration. Otherwise, there is a fear that a gap might be made between an apparent data processing performance of only a calculator and a data processing performance of a whole system in order to carry out an application to an actual product. The reason is as follows. In order to operate a plurality of calculating units in parallel, the number of operands required once is also increased and a load and store processing is to be often performed.

In an image and voice processing application to which the flexible processor is mainly intended, moreover, it can be supposed that there is a high possibility that a data input/output might have a stream format. For this reason, it is necessary to investigate a method of implementing a flexible processor which has a high data transfer performance, that is, a high transfer throughput and a flexibility of a transfer control as a whole system and can thus process stream data efficiently.

Furthermore, the concept of programming in the flexible processor is greatly different from that of a general microprocessor. The reason is as follows. An instruction for a calculation processing is to be distributed in such a manner that individual calculating units can sequentially carry out a data processing in accordance with a connecting state of the calculating unit. Accordingly, it can be supposed that the degree of difficulty of a software development is increased. For this reason, the inventor found a necessity of constituting a flexible processor in order to freely change a data processing performance scalably while maintaining a software reusability. In short, the inventor found the following. More specifically, it is more desirable that existing software can be combined and applied than a new development of another software in order to execute a predetermined task, and furthermore, it is more desirable that an existing processing unit of a plurality of calculating units should be set to be several times as great in order to enhance a data processing performance.

The inventor further investigated the data processing performance utilizing the flexible processor. Consequently, the number of operands required at a time is also increased due to the execution of a parallel operation of a plurality of calculating units, and a plurality of calculators is to often carry out a load and store processing together with a data memory. At the same time, it is also necessary to often carry out a transfer processing of storing calculating object data in the data memory from an outside and a processing of transferring calculation result data from the data memory to the outside. For such a request, it is effective to use a plurality of multiport data memories. However, a chip occupation area of the data memory is doubled in proportion to the number of ports which can be subjected to a parallel access. For this reason, the number of the ports of the multiport data memory is limited involuntarily.

It is a typical object of the invention to provide a data processor capable of carrying out a dynamic reconfiguration which can implement a data transfer having a high flexibility.

It is another typical object of the invention to provide a data processor capable of carrying out a dynamic reconfiguration which can contribute to an implementation in a high software reusability.

It is yet another typical object of the invention to provide a data processor capable of relieving the influence of the limitation of the number of ports for a data memory having a multiport on a data processing performance.

It is a further typical object of the invention to provide a semiconductor device for a data processing which comprises a data memory having a multiport and has a high area versus processing performance index.

The above and other objects and novel features of the invention will be apparent from the description of the specification and the accompanying drawings.

Brief description will be given to the summary of the typical invention disclosed in the application.

[1-1] A data processor comprises at least one processor block (450), wherein the processor block includes a calculating portion (800) having a plurality of calculating units and capable of switching their connecting forms and functions, a local memory portion (820) having a plurality of banks (821) capable of being accessed in parallel, an external interface portion (840, 850, 860), a bus switch portion (810) and a control portion (830). A part of the calculating units (801, 804) in the calculating portion can generate a load request of an operation operand to the other calculating units (802, 803) and a store request of a result of a calculation carried out by the other calculating units, and the bus switch portion can select a connection among the calculating portion, the local memory portion and the external interface portion.

In the case in which the calculating function of the calculating portion can be reconfigured dynamically corresponding to the switching of the connecting form and function of the processor block and a necessary data transfer is carried out before and after a calculation processing through the reconfigured calculating function, the bus switch portion can transfer the operand from the local memory portion or the external interface portion to the calculating portion and can transfer the result of the calculation carried out by the calculating portion to the external interface portion. Consequently, a data transfer having a high flexibility can be implemented in the data processor such as a flexible processor.

[1-2] As a specific form, the control portion determines a connecting form and a function of the calculating unit for the calculating portion, and the control portion determines a connecting form by the bus switch portion. In this case, it is sufficient that a common address is mapped into the banks of the local memory portion. On the other hand, in the case in which the bus switch portion determines a connecting form thereof corresponding to an access address, it is necessary to map different addresses into the banks of the local memory portion.

[1-3] As another specific configuration, the calculating portion has a plurality of first calculating units (802, 803) disposed in a matrix, and a second calculating unit (801, 802) disposed between the first calculating units and the bus switch portion, and the second calculating unit can generate the load request and the store request.

As yet another specific form, the local memory portion has a plurality of access ports, one of the access ports is connected to the external interface portion and can be accessed from an outside and the other access ports are connected to the bus switch portion and can be accessed from the second calculating unit.

As a further specific form, the first calculating unit has a calculator, an input switch for switching an input of an operand to the calculator, a delay regulating unit for regulating a delay between the operands input through the input switch, an output switch for switching an output path of the calculator, a pipeline latch for holding data output through the output switch, and a first calculation control unit for controlling an operation of the first calculating unit in accordance with an instruction sent from the control portion.

As a further specific form, the second calculating unit has an address generating unit (921), a load store control unit (920, 922, 923, 926) for generating the load request and the store request by using an address generated in the address generating unit, and a second calculation control unit for controlling an operation of the second calculating unit in accordance with an instruction sent from the control portion.

As a further specific form, the second calculating unit transmits data to the bus switch portion in accordance with a predetermined request format and processes data received in accordance with a predetermined response format.

As a further specific form, the bus switch portion has a switch matrix for establishing a connecting path among the second calculating unit, the local memory portion and the external interface portion, and a memory interface (931) for carrying out a conversion between the request format and the response format and an access procedure for the local memory portion.

[1-4] As a further specific form, the external interface portion of the processor block has an access port (850, 860), and the access port can be interfaced with an outside of the data processor. The external memory is connected to the access port and can be thus utilized.

[1-5] As a further specific form, there is provided a plurality of processor blocks, wherein the external interface portion of the processor block has an access port, and the access port of one of the processor blocks is connected to the access ports of the other processor blocks. For example, when tasks A and B which can be processed by the individual processor blocks are supposed, the task A is processed by the processor block in a former stage and the processor block in a next stage receives the result of the processing and processes the task B in the case in which configuration data for implementing the tasks A and B, that is, software for reconfiguring the calculating function corresponding to the switching of the connecting form and function of the processor block is prepared. By such a serial processing on a pipeline basis, it is possible to implement a processing of a task of A+B. In case of a task of A+C, it is possible to process the task of A+C on a pipeline basis by applying the configuration data corresponding to the individual tasks A and C. If the number of serial connecting stages of the processor block is n, it is possible to process a task obtained by combining n types of tasks by applying n types of individual existing configuration data. On the other hand, in the case in which the task of A+B is processed by using the processor block in which the number of the calculating units in the calculating portion is doubled, for example, a calculation processing time required for the task of A+B is equal to that described above. However, it is impossible to apply the configuration data of the existing tasks of A and B. For this reason, it is necessary to generate new configuration data for the task of A+B. In this meaning, it is possible to implement a high software reusability.

As a specific form, one of the processor blocks can give access to the local memory portions of the other processor blocks through the access port.

[1-6] A data processor according to another aspect comprises a plurality of processor blocks, wherein the processor block includes a calculating portion having a plurality of calculating units and capable of switching their connecting forms and functions, and a local memory portion, and one of the processor blocks is connected to the other processor blocks. Consequently, it is possible to implement a high software reusability.

As a specific form, the local memory portion has a plurality of banks which can be accessed in parallel. The calculating units for carrying a parallel operation can utilize the local memory portion in parallel.

As a specific form, the calculating portion can generate a load request of a calculation operand and a store request of a result of a calculation.

As a specific form, one of the processor blocks and the other processor block are connected to each other through a dedicated bus.

[1-7] A data processor according to another aspect comprises a plurality of processor blocks, wherein the processor block includes a calculating portion having a plurality of calculating units and capable of switching their connecting forms and functions, and a local memory portion, and one of the processor blocks can be written to the local memory portions of the other processor blocks.

As a specific form, the local memory portion has a plurality of banks which can be accessed in parallel. Moreover, a part of the calculating units in the calculating portion can generate a load request of an operation operand to the other calculating units and a store request of a result of a calculation carried out by the other calculating units. Furthermore, one of the processor blocks has a dedicated bus for carrying out write to the local memory portions of the other processor blocks.

[2-1] A further data processor (11) according to the invention comprises a calculating portion (20), a plurality of data memories (21), a plurality of memory control circuits (22), an external interface portion (23), a crossbar switch portion (24) and a control portion (25). The calculating portion includes a plurality of calculating cells (26) for executing a calculation, their logical functions being defined based on configuration data. The data memory has a plurality of access ports (RAMPRT0, RAMPRT1) capable of being operated in parallel and holds calculation data. The memory control circuit controls access of the corresponding data memory and has a control form defined based on configuration data. The external interface portion is connected to the memory control circuit. The crossbar switch portion connects the calculating portion to the memory control circuit and has a connecting form defined based on configuration data (FECFG). The control portion carries out a control for transferring the configuration data to the calculating cell, the memory control circuit and the crossbar switch portion and controls their status transition. The memory control circuit can accept a first access request given from the external interface portion to the data memory and a second access request given from the calculating cell to the data memory and an access response control procedure for responding to the first access request and the second access request can be varied based on the configuration data.

The logical function of the calculating portion can be reconfigured dynamically based on the configuration data. In the case in which a necessary data transfer is carried out before and after the calculation processing by the reconfigured logical function, the memory control circuit stores the calculation data transferred from an outside in the data memory and supplies the calculation data to the calculating portion, and stores the result of the calculation carried out by the calculating portion in the data memory and outputs the result of the calculation which is stored to the outside. Consequently, it is possible to implement a data transfer having a high flexibility in the data processor such as a flexible processor.

From the foregoing, a plurality of data memories having a multiport can be accessed from the external interface portion or the calculating cell through the memory control circuit. It is not necessary to assign a dedicated port in order to connect the data memory to the external interface portion. It is possible to use the multiport of the data memory for both the first access given from the external interface portion and the second access given from the calculating cell. Consequently, an empty port in the load and store processing between the calculator and the data memory can be distributed for the transfer between the outside and the data memory. Similarly, the empty ports in the transfer processing of storing the calculating object data in the data memory from the outside and the processing of transferring the calculation result data from the data memory to the outside can be distributed for the transfer between the calculator and the data memory. Accordingly, it is possible to enhance a data transfer performance among the calculator, the data memory and the external interface portion without increasing the number of the ports of the data memory.

Furthermore, the access response control procedure for responding to the first access request and the second access request can be changed dynamically based on the configuration data. Therefore, the degree of freedom is increased in such a manner that a data transfer rate together with the data memory is maximized corresponding to the contents of the calculation processing in the calculating portion and the calculation processing situation, and furthermore, priority is given to the access of the data memory in a specific processing. Consequently, it is also possible to enhance a data processing performance in the calculating portion.

As a specific form of the invention, the memory control circuit can carry out first to fourth controls as the access response control procedure which can be varied. The first control serves to accept the first access request to utilize one of the access ports of the data memory. The second control serves to accept the second access request to utilize one of the access ports of the data memory. The third control serves to accept the second access requests which are different in parallel to utilize the access ports which are different from each other. The fourth control serves to accept the first access request to utilize one of the access ports of the data memory and serves to accept the second access request to utilize the other access ports of the data memory.

As another specific form of the invention, the memory control circuit may employ the following control in addition to the foregoing.

First of all, the memory control circuit can carry out such a control as to return a busy state to the external interface portion in response to the first access request when all of the access ports are used in response to the second access request as the access response control procedure which can be varied for the corresponding data memory. By returning the busy state, the receiving side recognizes that the first access request is rejected. Consequently, it is possible to instantly take a countermeasure by inserting a weight or changing processing scheduling on the receiving side of the busy state.

Secondly, the memory control circuit can carry out such a control as to return a busy state to a request source of one of the second access requests in response to the first access request when all of the access ports are used in response to the second access request as the access response control procedure which can be varied for the corresponding data memory. By returning the busy state, the calculating cell to be the receiving side recognizes that the second access request is rejected. Consequently, it is possible to take a countermeasure by inserting a weight or changing processing scheduling on the receiving side of the busy state.

At this time, the memory control circuit may carry out such a control as to return a busy state to an access request source to be connected to an access port having low priority in accordance with the priority of the access port in order to select the request source of one of the second access requests for returning the busy state. Consequently, it is possible to define the configuration data in order to utilize an access port having high priority for a data processing having high priority. Therefore, it is possible to prevent the data processing having the high priority from being disturbed by the first access request.

In this case, furthermore, the priority of the access port may be varied in accordance with the configuration data in the memory control circuit. The degree of freedom of the control is increased.

Thirdly, the memory control circuit carries out such a control as to preferentially accept any of the first and second access requests which has priority set to be higher when the same access requests conflict with each other. In some cases, it is more advantageous to give priority to the first access request or the second access request depending on the contents of the data processing to be carried out by the calculating cell or the situation of the progress of the calculation. In consideration of this fact, it is possible to contribute to an enhancement in the data processing performance depending on the set of the priority.

At this time, the priority of the first access request and the second access request may be set separately for each access port in the memory control circuit. It is possible to carry out a finer priority control.

In this case, furthermore, it is preferable that the priority of the first access request and the second access request should be varied in accordance with the configuration data in the memory control circuit.

[2-2] A data processor (2) according to the invention comprises a flexible processor (11), a CPU (12) and an RAM (13) which are connected to an internal bus (10). The flexible processor has a calculating portion, a plurality of data memories, a plurality of memory control circuits, an external interface portion, a crossbar switch portion and a control portion. The calculating portion has a plurality of calculating cells for executing a calculation, and their logical function is defined based on configuration data. The data memory has a plurality of access ports capable of being operated in parallel and holds calculation data. The memory control circuit controls access of the corresponding data memory and has a control form defined based on configuration data. The external interface portion is connected to the memory control circuit. The crossbar switch portion connects the calculating portion to the memory control circuit and has a connecting form defined based on configuration data. The control portion carries out such a control as to transfer the configuration data to the calculating cell, the memory control circuit and the crossbar switch portion and controls their status transition. The memory control circuit can accept a first access request given from the external interface portion to the data memory and a second access request given from the calculating cell to the data memory, and an access response control procedure for responding to the first access request and the second access request can be varied based on the configuration data. The external interface portion is connected to the internal bus. The CPU can execute a program stored in the RAM and can transfer data retained in the RAM from the external interface portion to the data memory. The CPU can transfer calculation result data obtained by the flexible processor retained in the data memory from the external interface portion to the RAM.

BRIEF DESCRIPTION OF THE DRAWINGS

FIG. 11 is an explanatory diagram illustrating a data format of a memory access.

DETAILED DESCRIPTION OF THE PREFERRED EMBODIMENTS

A preferred embodiment according to the invention will be described with reference to the accompanying drawings. A circuit unit constituting a data processing LSI according to an example is formed on a semiconductor substrate such as single crystal silicon by a semiconductor integrated circuit technique such as a well known CMOS (complementary type MOS transistor) or bipolar transistor, which is not particularly restricted.

Figure 1:
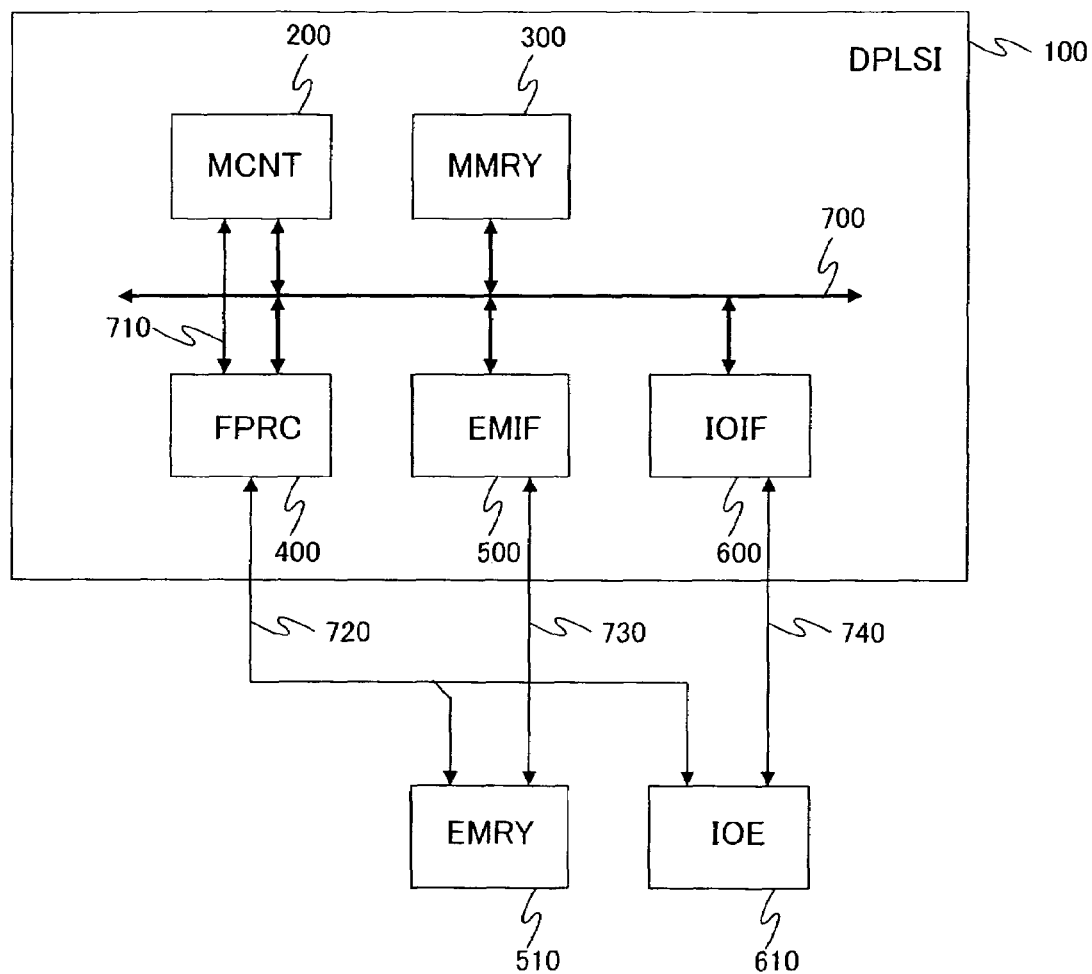
FIG. 1 is a block diagram illustrating a data processing system.

FIG. 1 shows an example of a data processing system. The data processing system is constituted by a data processing LSI (DPLSI) 100, an external storage device (EMRY) 510 and an input/output device (ICE) 610, and furthermore, the data processing LSI 100 includes a main controller (MCNT) 200, a main memory (MMRY) 300, a flexible processor (FPRC) 400, an external storage device interface (EMIF) 500, and an input/output interface (IOIF) 600, and they are connected to each other through a system bus 700 and are formed into a semiconductor chip, which is not particularly restricted.

The main processor 200 is a data processor including the same peculiar instruction set as that in a general microprocessor, and controls an operation of a system in accordance with a control program (not shown) stored in the main memory 300 or the external storage device 510 connected through an external storage device connecting bus 730, and furthermore, executes a data processing.

The main memory 300 serves to hold information for executing software such as a control program or data which is/are not shown, and is constituted by a unit having a storage function, for example, an SRAM, a DRAM or a flip-flop. The main memory 300 may be an identical chip to the data processing LSI 100 or a different chip from the data processing LSI 100.

The flexible processor 400 is a data processor for carrying out a predetermined calculation based on configuration data which can be defined by a program and has such a structure that a predetermined calculation is executed for data input from the main memory 300, the external storage device 510 connected through an input/output bus 720 or the input/output device 610 and a result can be output to the main memory 300, the external storage device 510 or the input/output device 610. Furthermore, it is desirable that the contents of the operation should be constituted to be controlled by the main controller 200 connected through a control bus 710.

The external storage device interface 500 serves to connect the external storage device 510 such as a hard disk drive or a CD-ROM drive to the external storage device connecting bus 730 and can implement a data transfer between each module on the system bus 700 and the external storage device 510 by a predetermined protocol, which is not particularly restricted.

The input/output device interface 600 serves to connect the input/output device 610 such as an image input/output device, a voice input/output device, an A/D converter or a D/A converter through an input/output device connecting bus 740, and can implement a data transfer between each module on the system bus 700 and the input/output device 610 by a predetermined protocol which is not particularly restricted.

The structure of the flexible processor 400 will be described below in detail.

Figure 2:
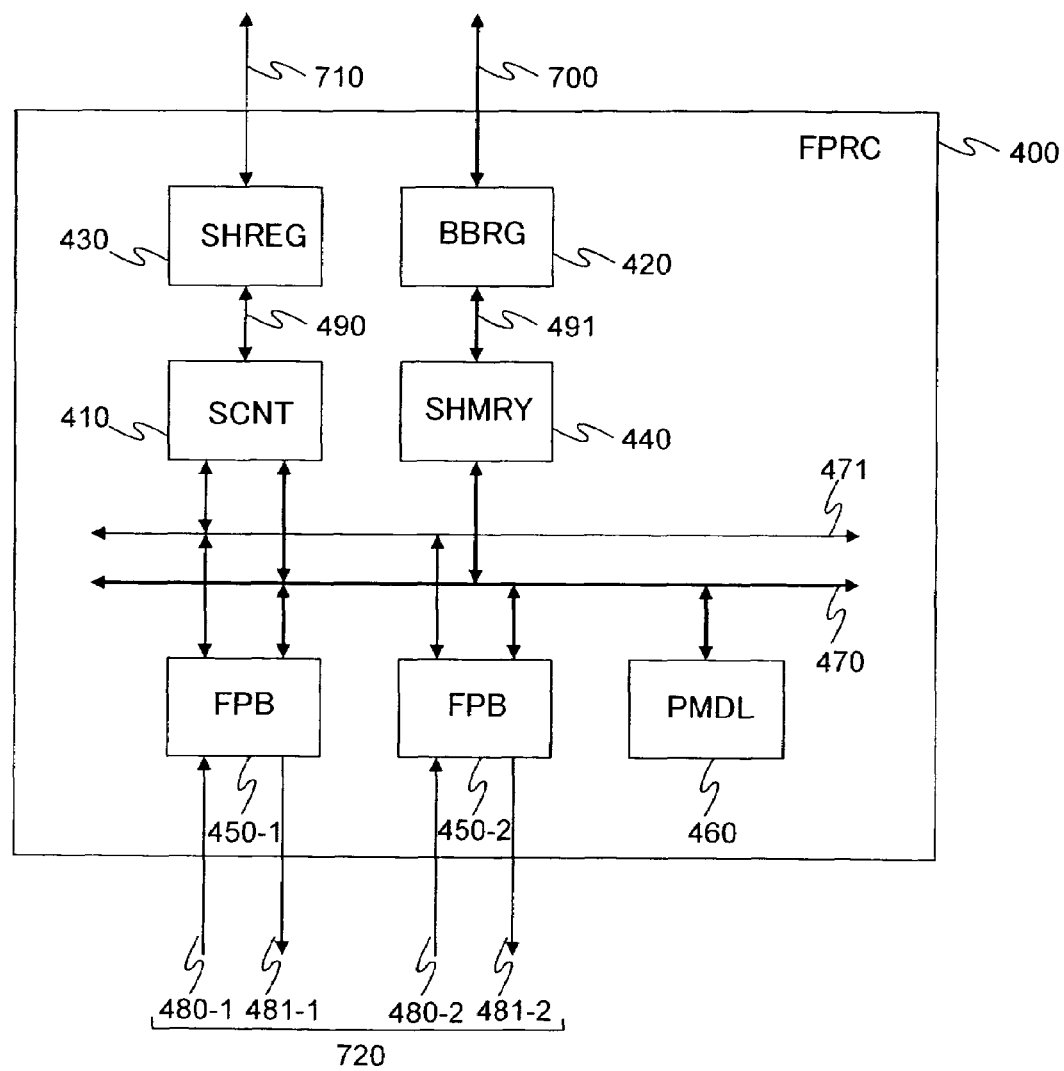
FIG. 2 is a block diagram showing a first example of a flexible processor.

FIG. 2 shows a first example of the flexible processor 400. The flexible processor 400 includes a subcontroller (SCNT) 410, at least one flexible processor block (FPB) 450-1 to 450-2, and a peripheral module (PMDL) 460 and they are connected to each other through a processor internal bus 470, which is not particularly restricted. It is more desirable to include a bus bridge (BBRG) 420, a shared register (SHREG) 430 and a shared memory (SHMRY) 440 and to have such a structure that a predetermined control signal or data can be transferred together with the main controller 200 or the main memory 300.

The subprocessor 410 is a data processor including the same peculiar instruction set as that of a general microprocessor or a part thereof, and the main processor 200 executes a control program stored in a control memory (not shown) in response to a predetermined command set to the shared register 430 through the control bus 710, thereby controlling the operations of the flexible processor blocks 450-1 to 450-2 and the peripheral module 460.

The bus bridge 420 serves to control a shared memory bus 491 connected to the shared memory 440 and to give a predetermined response to the system bus 700 in the case in which access is generated on a predetermined address space over the system bus 700.

The shared register 430 can carry out read/write from/to the main controller 200 through the control bus 710 and the subcontroller 410 through a shared register bus 490 respectively, and has such a structure as to include a command request field sent from the main controller 200 and a command response field sent from the subcontroller 410, which is not particularly restricted. Consequently, the main controller 200 generates a command such as a reset, starting, a standby, an interruption into the subcontroller, a data transfer from the shared memory, a data transfer to the shared memory or an update of a control program of the subcontroller 410 over the subcontroller 410, and the subcontroller 410 can give a response such as a notice of a completion or a notice of an error to the command so that an excellent linkage control between the main controller 200 and the subcontroller 410 can be implemented. Furthermore, an interruption request field from the subcontroller 410 and an interruption response field from the main controller 200 are provided in the shared register 430. Consequently, it is possible to carry out a flexible and efficient two-way linkage control.

Figure 6:
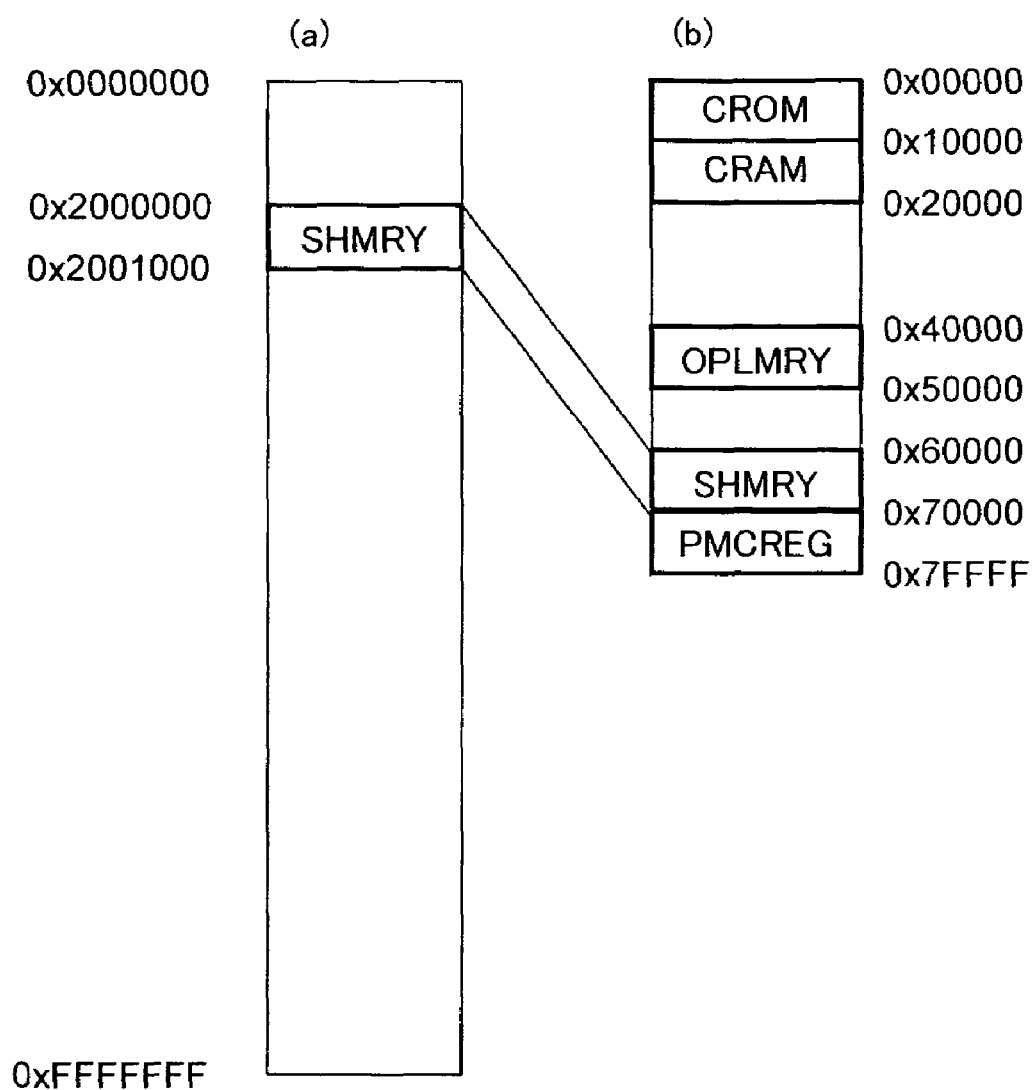
FIG. 6 is an address map showing an address space of a shared memory.

The shared memory 440 has two ports which can carry out read/write at the same time and is a memory of a 2-port type which can carry out the read/write by an access to respective predetermined address spaces on the system bus 700 and the internal bus 470 of the flexible processor 400. Consequently, data sharing and a mutual transfer between the system bus 700 and the internal bus 470 of the processor 400 can be carried out, and furthermore, an independency between the buses can be enhanced. Consequently, the operation of the flexible processor 400 can be controlled easily. FIGS. 6(a) and 6(b) show an example of the address space of the shared memory 440 assigned onto the system bus 700 and the internal bus 470 of the processor 400, respectively. CROM indicates a control ROM, CRAM indicates a control RAM, OPLMRY indicates a calculating local memory, PMCREG indicates a peripheral module control register, and SHMRY indicates a shared memory 440.

The flexible processor blocks 450-1 to 450-2 carry out a predetermined calculation based on configuration data (not shown) which can be defined by a program to be executed over the subcontroller 410 and are held in the block and a control signal transferred from the subcontroller 410 through a block control bus 410. There are provided input buses 480-1 to 480-2 and output buses 481-1 to 481-2 which are independent of the processor internal bus 470 respectively (which are collected into the input/output bus 720). Consequently, it is possible to implement the supply of calculation data having a high throughput and an output of a result of the calculation without occupying a band of the internal bus 470 of the processor 400. Therefore, they are suitable for executing a task requiring to process multimedia type stream data such as an image or a voice at a high speed.

The peripheral module 460 is a DMA controller, a timer or a processor, which is not particularly restricted, and carries out a linkage operation together with the subcontroller 410 and the flexible processor blocks 450-1 to 450-2 so that an enhancement in a control efficiency and a calculating capability can be implemented.

Figure 3:
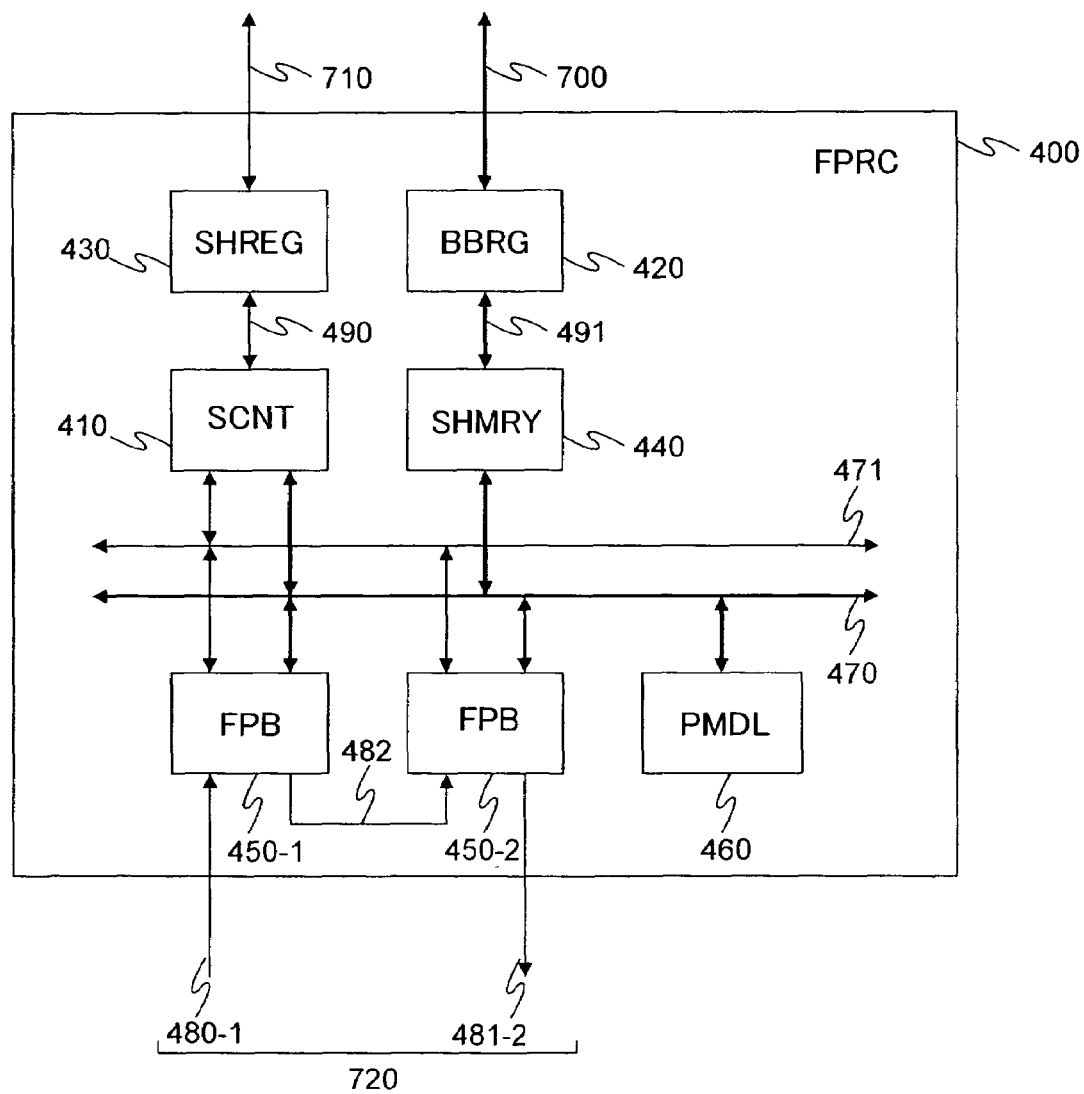
FIG. 3 is a block diagram showing a second example of the flexible processor.

FIG. 3 shows a second example of the flexible processor 400. The example is different from the first example in that there is provided an interblock bus 482 coupling the output bus 481-1 of the flexible processor block 450-1 to the input bus 480-2 of the flexible processor block 450-2 in the processor 400. Consequently, it is possible to carry out a data transfer having a small overhead between a plurality of flexible processor blocks without occupying the band of the processor internal bus 470. Consequently, it is possible to implement a suitable processor for a scalable stream data processing having a high efficiency in which a plurality of blocks is linked like a pipeline.

Figure 4:
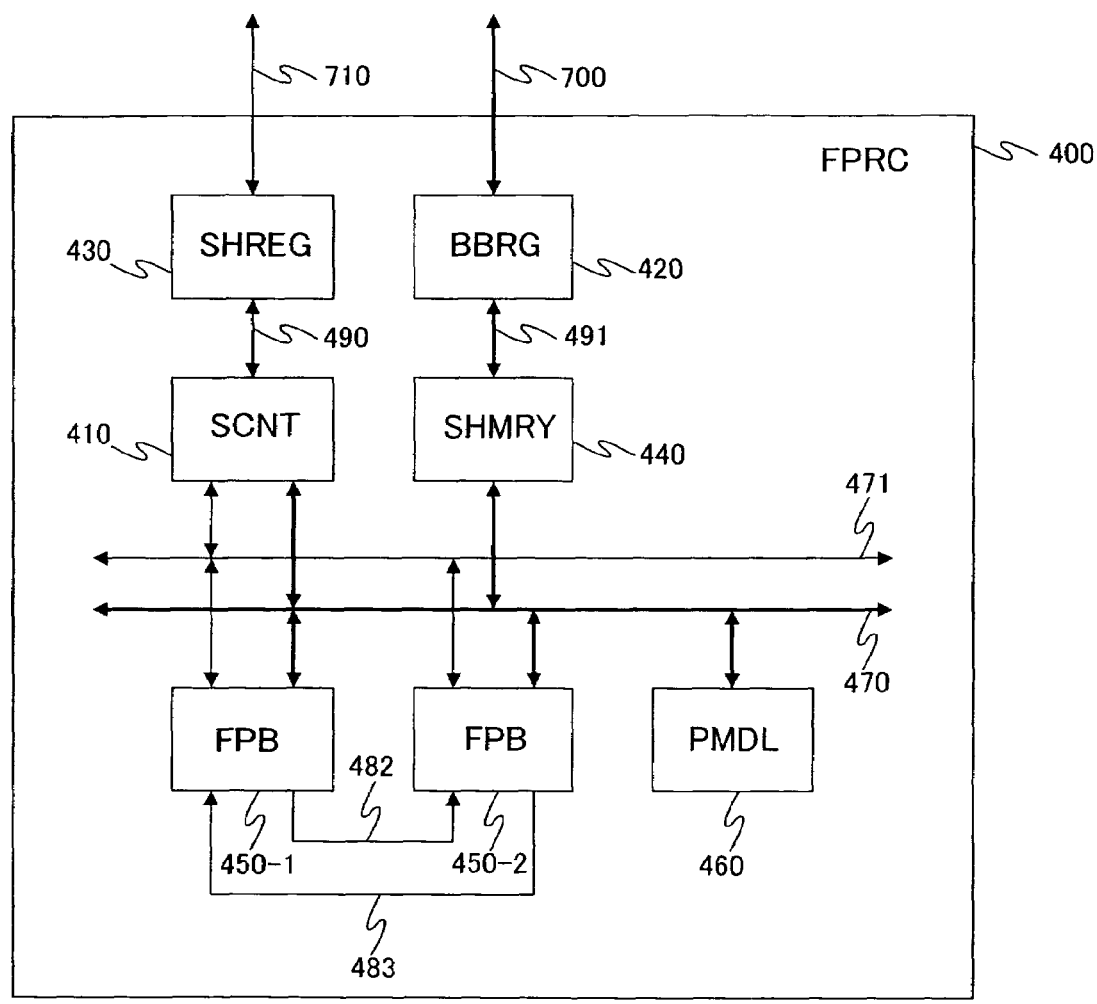
FIG. 4 is a block diagram showing a third example of the flexible processor.

FIG. 4 shows a third example of the flexible processor 400. The example is different from the first example in that there are provided interblock buses 482 and 483 obtained by connecting the input buses 480-1 to 480-2 and the output buses 481-1 to 481-2 in the processor 400 opposite to each other and the input/output bus to/from the outside of the processor 400 is omitted. Consequently, it is possible to carry out a two-way data transfer having a small overhead between a plurality of flexible processor blocks without occupying the band of the processor internal bus 470. In addition, it is possible to implement a mutual utilization of a hardware resource such as a calculating cell or a calculating local memory, thereby realizing a suitable processor for a data retrieval or an associative processing.

Figure 5:
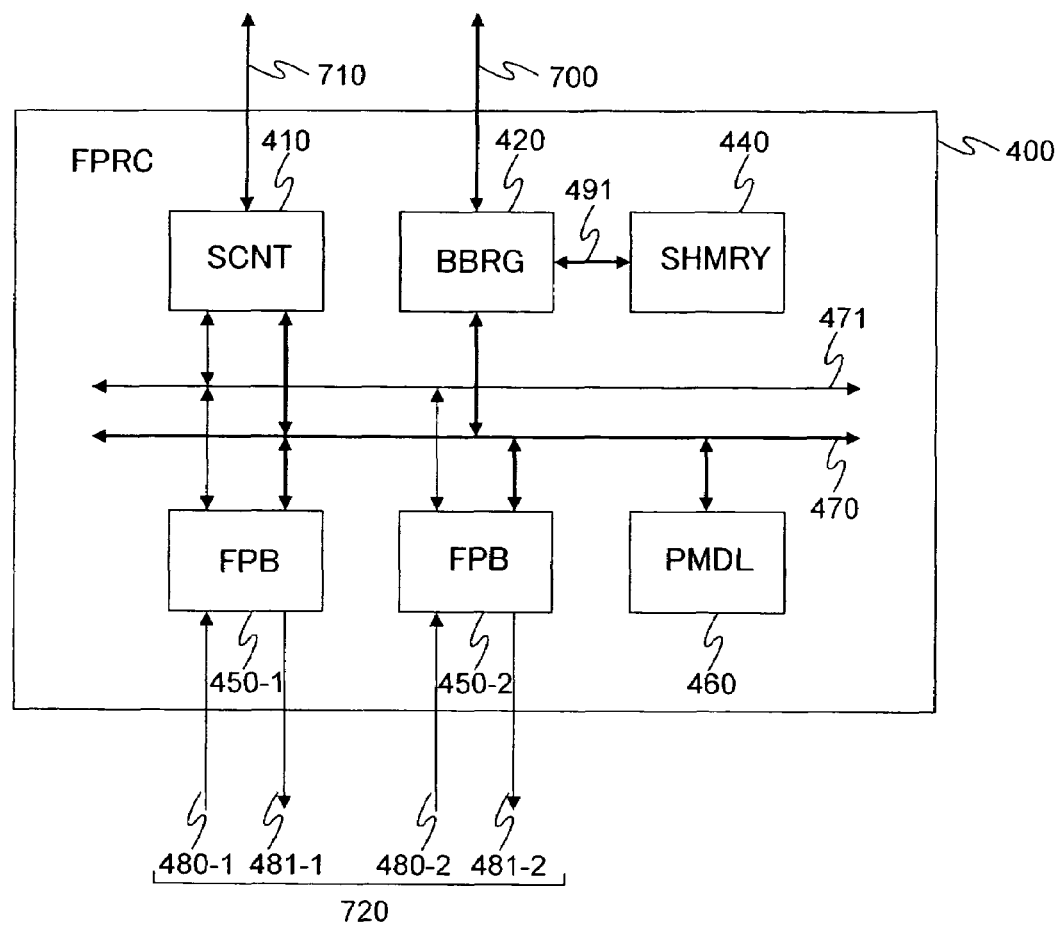
FIG. 5 is a block diagram showing a fourth example of the flexible processor.

FIG. 5 shows a fourth example of the flexible processor 400. The example is different from the first example in that a function for arbitrating access to the shared memory 440 through the system bus 700 and the processor internal bus 470 is added to the bus bridge 420 and the shared memory 440 is replaced with a 1-port type capable of reducing an area per capacity, and furthermore, a linkage control with the main controller is simplified to eliminate the shared resistor 430. Consequently, the area of the flexible processor 400 over a semiconductor chip can be reduced or the capacity of the shared memory 440 can be increased under restriction of the same area on the chip.

FIGS. 2 to 5 show the typical examples of the flexible processor 400 to which the invention is applied, and there is not eliminated the implementation of the flexible processor obtained by freely combining a part of the examples, that is, opposing and connecting the input/output buses to each other based on the fourth example, for instance. Moreover, the number of the flexible processor blocks, the number of the processor internal buses, and the presence of the integration of the block control bus and the processor internal bus are freely selected and combined corresponding to an implementation cost and a data processing performance which are required for the flexible processor 400.

Subsequently, the structure of the flexible processor block will be described in detail.

Figure 7:
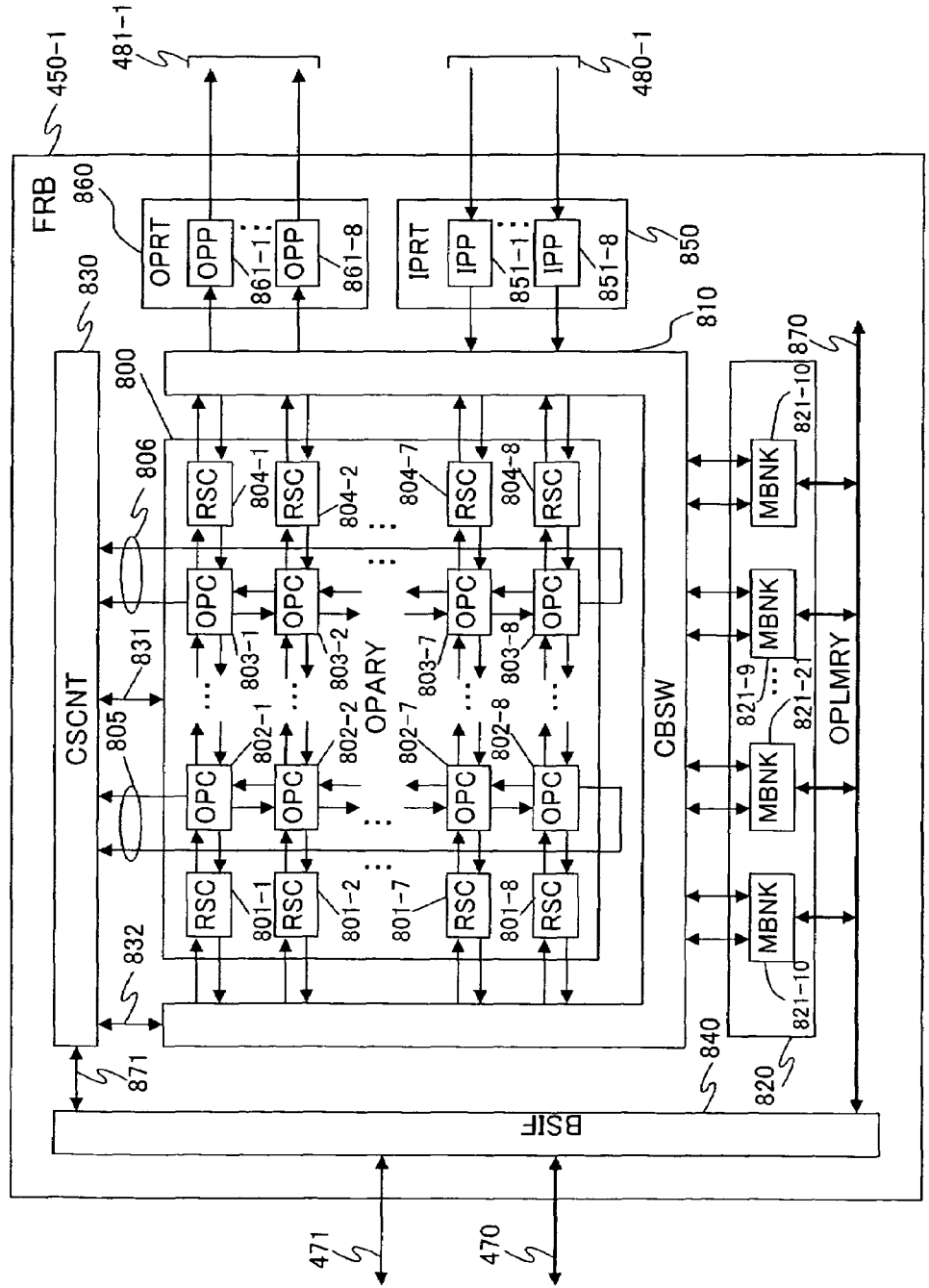
FIG. 7 is a block diagram showing an example of a flexible processor block.

FIG. 7 shows an example of the flexible processor block. The flexible processor block 450-1 includes a calculating array (OPARY) 800 to be a calculating portion, a calculating local memory (OPLMRY) 820 to be a local memory portion, and at least one of an input port (IPRT) 850 and an output port (OPRT) 860, and they are mutually connected through a crossbar switch (CBSW) 810 to be a bus switch portion, which is not particularly restricted. It is more desirable that a configuration sequence controller (CSCNT) 830 to be a control portion and a bus interface (BSIF) 840 should be provided and should be constituted to freely carry out a status management linked to the subcontroller 410 and a high-speed data transfer, respectively.

The calculating array 800 has a calculating performance which is almost identical to that of an arithmetic logical calculating unit in a general processor, and is constituted by calculating cells (OPC) 802-1 to 802-8 and 803-1 to 803-8 to be first calculating units arranged two-dimensionally, and load store cells (RSC) 801-1 to 801-8 and 804-1 to 804-8 to be second calculating units which are disposed on their left and right ends and are specialized in a memory access control function or a load and store function. The calculating cells 802-1 to 802-8 and 803-1 to 803-8 are mutually connected only between four adjacent cells in four directions, that is, vertical and transverse directions respectively so that a data transfer can be carried out at a high operating frequency limited between the adjacent cells, which is not particularly restricted. As compared with the case in which the function does not need to be single if only the input/output interfaces of the calculating cells are united, and a calculating cell capable of executing only an addition or subtraction and a calculating cell capable of executing only a cumulative calculation are disposed in an optimum pattern corresponding to a calculating characteristic of a task to be executed, thereby providing a calculating cell of a single type capable of executing all calculations, for example, an area on the semiconductor chip can be reduced more greatly and a calculating array having a higher performance per area can be implemented. Furthermore, it is apparent that the number of the calculating cells in the vertical and transverse directions can be set optionally by a required cost and a calculating performance. The load store cells 801-1 to 801-8 and 804-1 to 804-8 are disposed on the left and right ends of the calculating cell, which is not particularly restricted. One of them is mutually connected to the adjacent calculating cells to a right side (or a left side) and the other is mutually connected to the crossbar switch 810. The contents of the operations of the calculating cell and the load store cell are defined based on configuration data (CNFDAT) output from the configuration sequence controller 830 through a calculating array control bus 831 or information converted from the configuration data. The load store cells 801-1 to 801-8 and 804-1 to 804-8 can generate a load request of a calculating operand to the calculating cells 802-1 to 802-8 and 803-1 to 803-8 and a store request of a calculation result by the calculating cells 802-1 to 802-8 and 803-1 to 803-8.

The crossbar switch 810 has such a structure that a connecting path can be set optionally in order to implement a flexible data transfer among the calculating array 800, the calculating local memory 820, the input port 850 and the output port 860. The contents of the operation of the crossbar switch 810 are defined based on configuration data output from the configuration sequence controller 830 through a crossbar switch control bus 832 or information converted from the configuration data.

The calculating local memory 820 is constituted by a plurality of memory banks (MBNK) 821-1 to 821-10 including at least two ports and access can be independently given from the crossbar switch 810 and a clock internal bus 870 respectively. The number of the memory banks, the capacity of the memory bank and the number of the ports of each memory bank can be set optionally depending on a required cost and a calculating performance. Moreover, it is also possible to insert an access arbitrating circuit (not shown) among the crossbar switch 810, the block internal bus 870 and the calculating local memory 820, thereby constituting a memory bank of a 1-port type or a 2-port type which falsely includes at least three ports.

The configuration sequence controller 830 includes a configuration data buffer (not shown) for storing the configuration data of the calculating array 800 and the crossbar switch 810 and a sequence control table (not shown) for storing the update condition of the configuration data, and outputs the configuration data of the calculating array 800 and the crossbar switch 810 to the calculating array control bus 831 and the crossbar switch control bus 832, respectively. For the update condition of the configuration data, it is possible to specify values of trigger buses 805 and 806 and the number of passed cycles which are output from a predetermined cell in the calculating array 800, which is not particularly restricted.

The bus interface 840 has such a structure as to connect the processor internal bus 470 and the block control bus 471 to the block internal buses 870 and 871, thereby reading and writing an internal state of the flexible processor block, for example, the contents of the calculating local memory 820, and furthermore, to link and control the operation of the flexile processor block together with the subcontroller 410. Furthermore, it is also possible to have a function such as a data copy between the memory banks, an interleave transfer for giving access to the memory banks in a predetermined order and address pattern to carry out a data transfer or a parallel transfer for simultaneously giving access to the memory banks, thereby carrying out a data transfer, thereby enhancing a data transfer efficiency on the inside and outside of the flexible processor block, which is not particularly restricted.

The input port 850 is constituted by at least one input port controller (IPP) 851-1 to 851-8 and takes a synchronization between an input bus 480-1 and the crossbar switch 810 if necessary. In the case in which the number of the input ports required for a task to be executed by the flexible processor block is limited, it is possible to implement the data processing LSI having a high performance per area by setting the number of the input ports to be a minimum required for the execution. In the case in which a linkage processing of the flexible processor blocks is to be implemented, it is desirable that the number of the input ports should be equal to or greater than a half of the number of the load store cells in the calculating array 800 (that is, the number of the load store cells on either side part in the calculating array 800) in order to prevent the input port 850 from being a bottleneck of the data transfer, which is not particularly restricted.

The output port 860 is constituted by at least one output port controller (OPP) 861-1 to 861-8 and takes a synchronization between an output bus 481-1 and the crossbar switch 810 if necessary. In the case in which the number of the output ports required for a task to be executed by the flexible processor block is limited, it is possible to implement the data processing LSI having a high performance per area by setting the number of the output ports to be a minimum required for the execution. In the case in which a linkage processing of the flexible processor blocks is to be implemented, it is desirable that the number of the output ports should be equal to or greater than a half of the number of the load store cells in the calculating array 800 (that is, the number of the load store cells on either side part in the calculating array 800) in order to prevent the output port 860 from being a bottleneck of the data transfer, which is not particularly restricted.

The input port 850 and the output port 860 are connected to the crossbar switch 810 so that an efficient stream data processing having no transfer overhead can be carried out without the processor internal bus 470. More specifically, by setting a transfer path from the input port 850 to the calculating local memory 820, it is possible to directly store stream data transferred from the input port in the calculating local memory 820. By setting a transfer path from the calculating array 800 to the output port 860, it is possible to directly output the result of the calculation as the stream data.

While the flexible processor block 450-1 has been described above, the flexible processor block 450-2 is also the same. Moreover, it is preferable to have such a structure as to add enable information to all calculation data in the flexible processor block, thereby suppressing an ineffective calculation and memory access, which is not particularly restricted. In the case in which access is given to the external memory 510 through the input port 850 and the output port 860, furthermore, the input port 850 and the output port 860 carry out the alignment of data and the generation of a strobe signal in accordance with a necessary protocol for the memory access, which is not particularly restricted.

Figure 8:
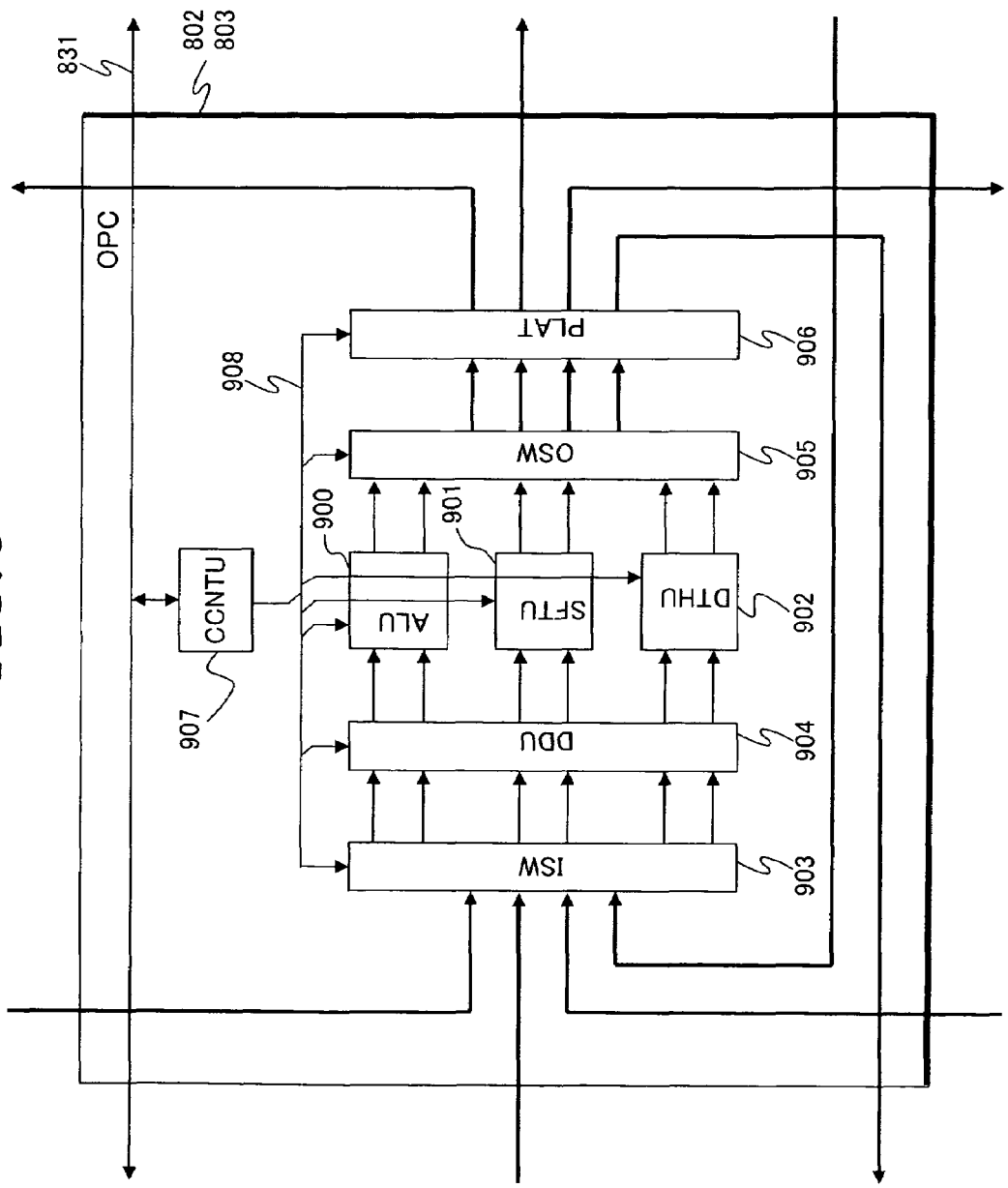
FIG. 8 is a block diagram showing a first example of a calculating cell.

FIG. 8 shows a first example of the calculating cell. The calculating cell 802-1 (802-2 to 802-8 and 803-1 to 803-8) is not particularly restricted but is constituted by an arithmetic logic calculating unit (ALU) 900 capable of executing an arithmetic logic calculating instruction and a flow control instruction, a shift calculating unit (SFTU) 901 capable of executing a shift instruction, a rotate instruction, a sign extension instruction and a swap instruction, a data through unit (DTHU) 902 capable of generating a data through output and a constant output, an input switch (ISW) 903 for selecting an input operand to be sent to the calculating unit from the outputs of four adjacent cells, a data delay unit (DDU) 904 for carrying out a delay regulation between the operands, an output switch (OSW) 905 for selecting output data to four adjacent cells, a pipeline latch (PLAT) 906, a cell control unit (CCNTU) 907 for controlling the operation of the calculating cell corresponding to the contents of the calculating array control bus 831, and a cell control bus 908. The instruction is executed in a throughput having one clock cycle and a minimum latency having one clock cycle.

Figure 9:
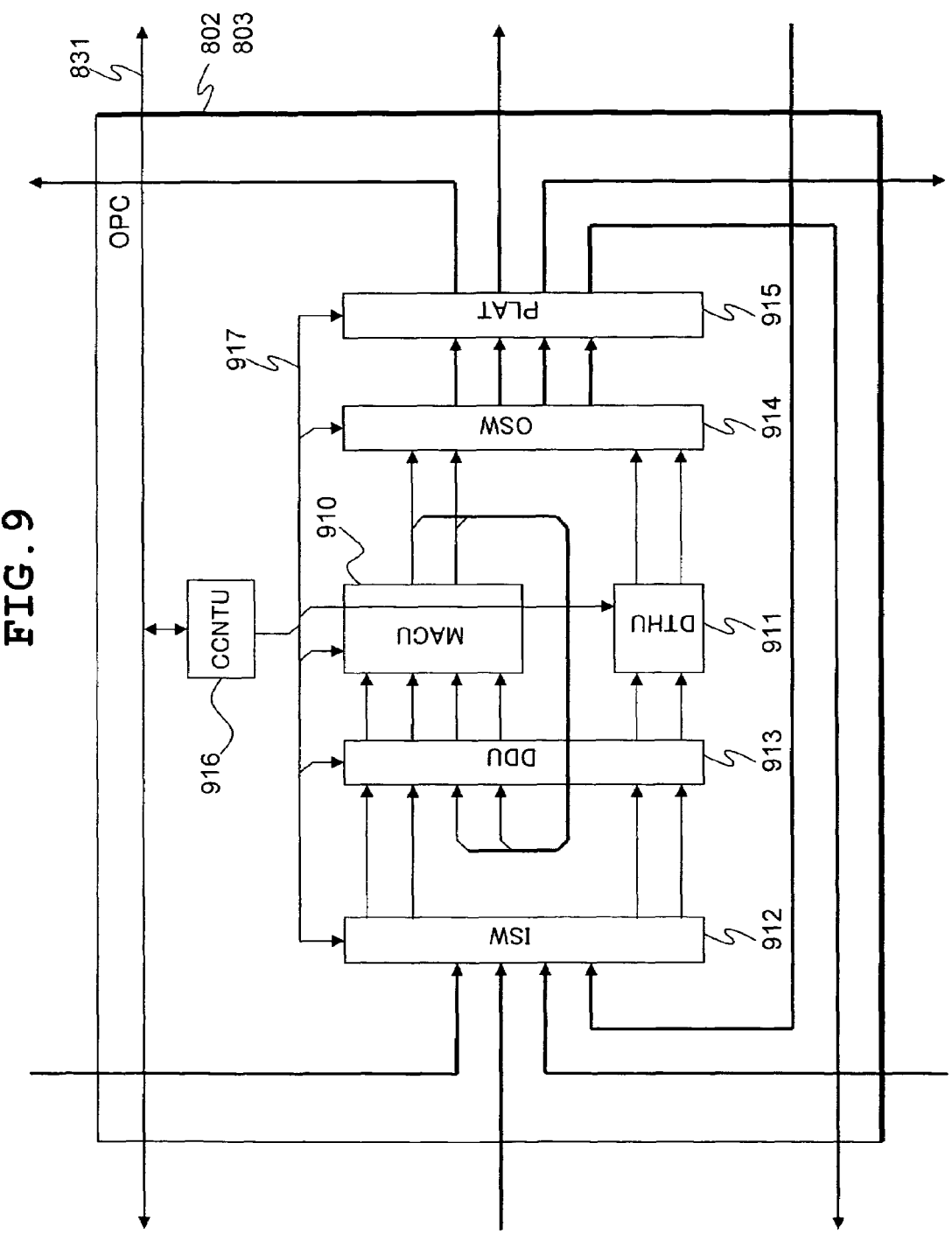
FIG. 9 is a block diagram showing a second example of the calculating cell.

FIG. 9 shows a second example of the calculating cell. The calculating cell 802-1 (802-2 to 802-8 and 803-1 to 803-8) is not particularly restricted but is constituted by a product sum calculating unit (MACU) 901 capable of executing an accumulating instruction, a multiplying instruction, a product sum calculating instruction, an adding and subtracting instruction having a saturation and a count instruction, a data through unit (DTHU) 911 capable of generating a data through output and a constant output, an input switch (ISW) 912 for selecting an input operand to be sent to the calculating unit from the outputs of four adjacent cells, a data delay unit (DDU) 913 for carrying out a delay regulation between the operands and holding a result of an intermediate calculation, an output switch (OSW) 914 for selecting output data to four adjacent cells, a pipeline latch (PLAT) 915, a cell control unit (CCNTU) 916 for controlling the operation of the calculating cell corresponding to the contents of the calculating array control bus 831, and a cell control bus 917. The instruction is executed in a throughput having one clock cycle and a minimum latency having 1 to 2 clock cycles in accordance with an instruction.

Figure 10:
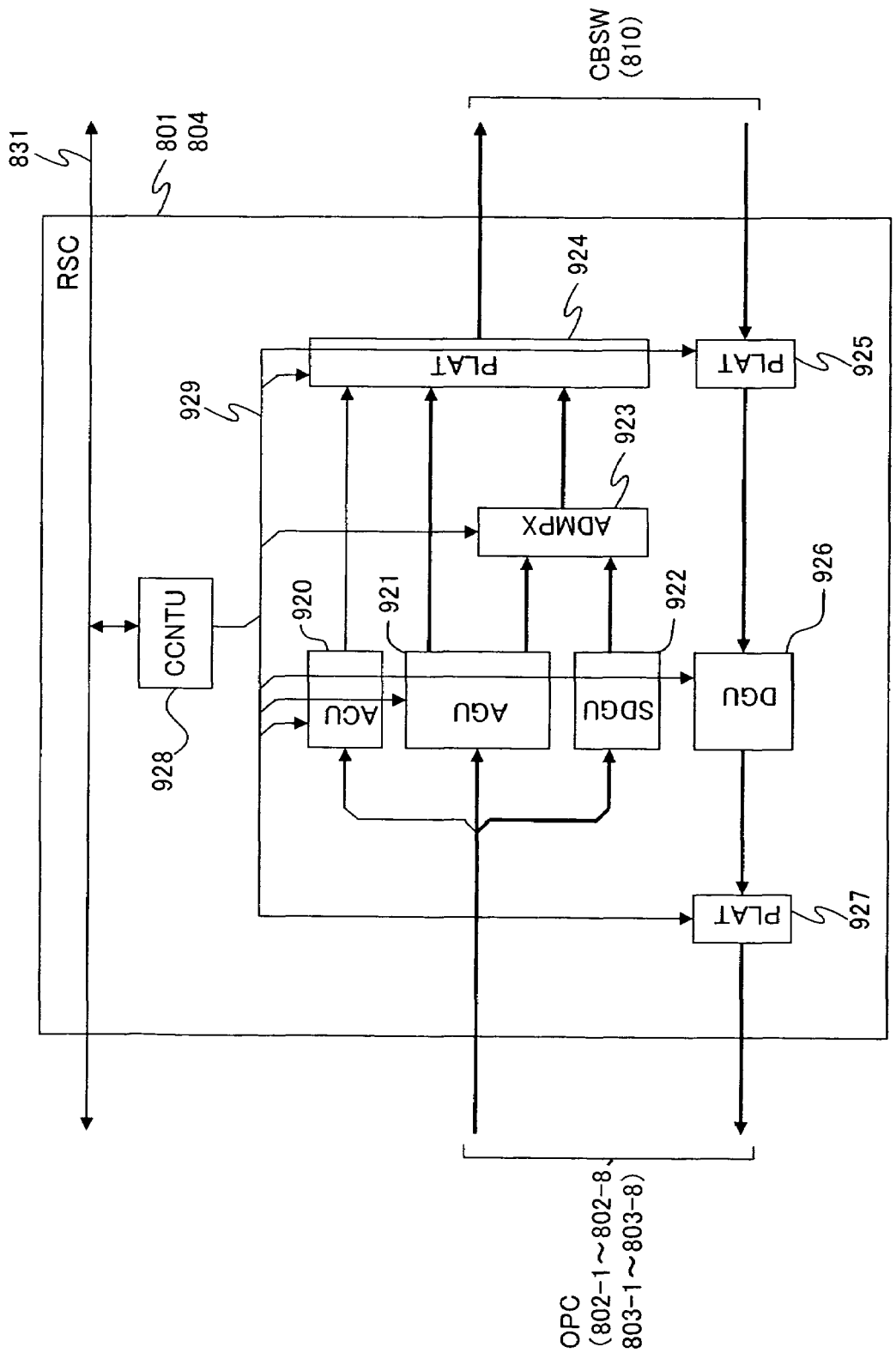
FIG. 10 is a block diagram showing an example of a load store cell.

FIG. 10 shows an example of the load store cell. The load store cell 801-1 (801-2 to 801-8 and 804-1 to 804-8) is not particularly restricted but is constituted by an access control unit (ACU) 920 for generating a predetermined memory access request signal on a read signal or a write signal, an address generating unit (AGU) 921 for generating an access address to at least the calculating local memory 820, a store data output unit (SDGU) 922 for outputting store data, an address/data multiplexer (ADMPX) 923 for generating a data format for predetermined memory access, a load data generating unit (DGU) 926 for carrying out the alignment of load data and a sign extension, pipeline latches (PLAT) 924, 925 and 927, a cell control unit (CCNTU) 928 for controlling the operation of the load store cell corresponding to the contents of the calculating array control bus 831, and a cell control bus 929. The access control unit (ACU) 920, the store data output unit (SDGU) 922, the address data/multiplexer (ADMPX) 923 and the load data generating unit (DGU) 926 constitute a load store control unit for generating a load request and a store request by using an address generated by the address generating unit (AGU) 921. It is possible to omit a part of the pipeline latches corresponding to a target operating frequency of the cell. The address generating unit 921 includes an adder (not shown) and can generate an address having a predetermined pattern by specifying a base address, an address increment and the number of additions as the configuration data of a cell, and furthermore, has such a structure as to use a data value output from the adjacent calculating cell as an address and can thus give memory access to a random address. In addition, the address generating unit 921 includes a read pointer and a write pointer (not shown), and has such a structure that it can logically utilize a predetermined memory bank as an FIFO buffer in linkage with the access control unit 920. Consequently, it is possible to easily treat stream data in a task to be executed.

The load store cell 801-1 (801-2 to 801-8 and 804-1 to 804-8) is not particularly restricted but can execute three base instructions shown in FIG. 11, and transmits data to the crossbar switch 810 in accordance with a predetermined request format (RESFRM) and processes the received data in accordance with a predetermined response format (ACKFRM), thereby implementing access to the calculating local memory 802. A base instruction (INST) shown in FIG. 11 is set to be single load (SLOD), single store (SSTR) and parallel load (PLOD). When the load store cell executes the single load (SLOD) or parallel load (PLOD) instruction, a load request is generated in accordance with a request format and is given to the crossbar switch 810. The crossbar switch 810 reads data from a load address (LODADRS) and returns a response format including the read data as load data (LODDAT) to the load store cell. The load store cell to which the response format is returned outputs the load data (LODDAT) included in the response format toward a calculating cell in a latter stage. Load addresses LODADRS0 and LODADRS1 are supplied to the parallel load together and load data LODDAT0 and LODDAT1 are returned thereto together. When the load store cell executes the single store (SSTR) instruction, a store request is generated in accordance with a request format and is given to the crossbar switch 810. The crossbar switch 810 writes store data (STRDAT) to the store address (STRADRS) and returns a response format thereof to the corresponding load store cell. A region shown in NON is an unused region. A first bit in three head bits of a request format (REQFRM) is a valid flag indicating the validity of the request, and second and third bits are commands indicating the type of the request. The head bit of the response format (RESFRM) is the valid flag indicating the validity of the request. In this example, the valid flag has a logical value of "1" which implies "valid". For example, the address generating unit 921 generates the valid flag and the command which are included in the request format.

Figure 12:
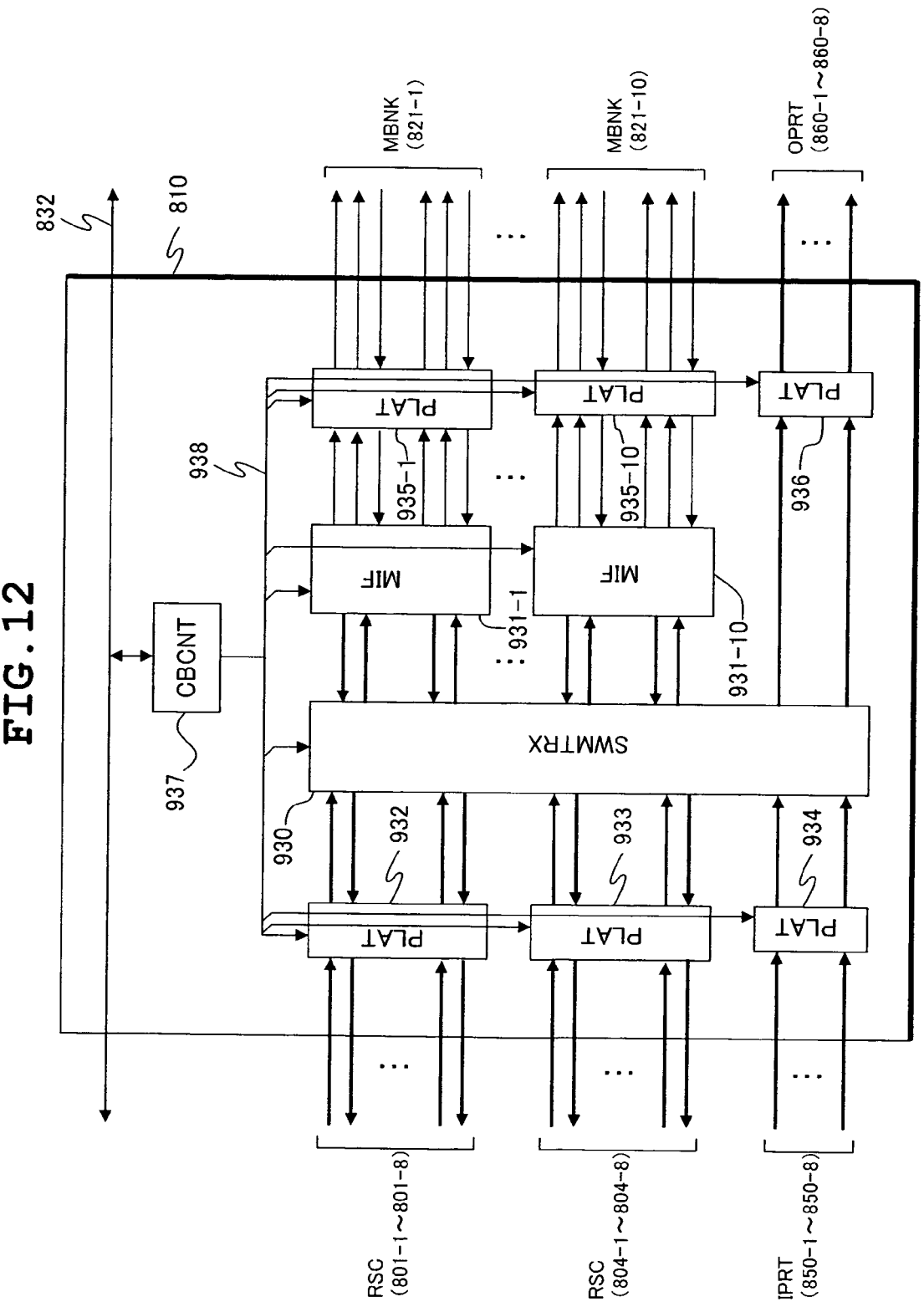
FIG. 12 is a block diagram showing an example of a crossbar switch.

FIG. 12 shows an example of the crossbar switch. The crossbar switch 810 is not particularly restricted but is constituted by a switch matrix (SWMTRX) 930 for establishing a connecting path between an input and an output, memory interfaces (MIF) 931-1 to 931-10 for carrying out a conversion between the request format and the response format shown in FIG. 11 and a predetermined reading and writing procedure for the memory banks 821-1 to 821-10, pipeline latches (PLAT) 932, 933, 934, 935-1 to 935-10 and 936, a crossbar control unit (CBCNT) 937 for controlling an operation of a crossbar switch corresponding to the contents of the crossbar switch control bus 832, and a crossbar control bus 938. Corresponding to the target operating frequency of the crossbar switch, it is possible to omit a part of the pipeline latches.

A structure of the switch matrix 930 will be described below in detail.

Figure 13:
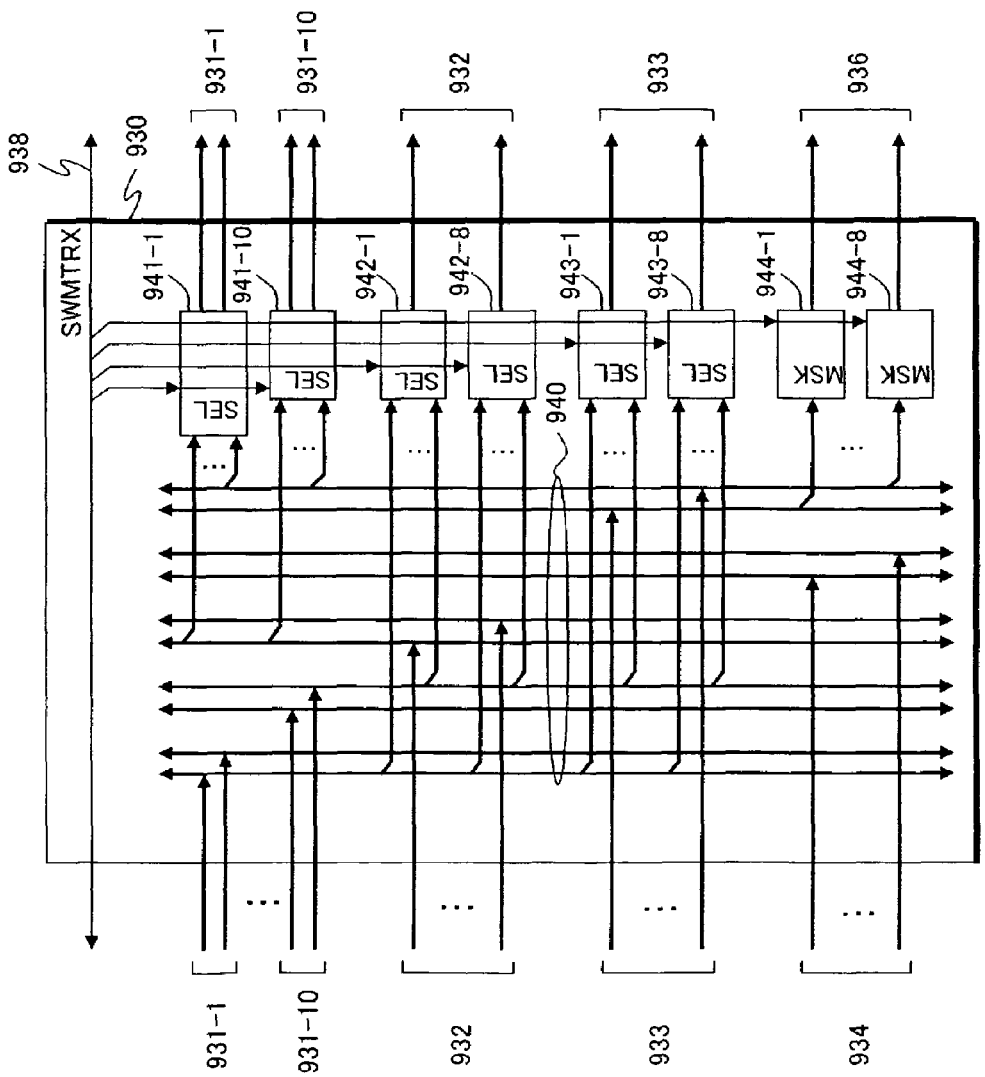
FIG. 13 is a block diagram showing a first example of a switch matrix.

FIG. 13 shows a first example (static structure) of the switch matrix. The switch matrix (SWMTRX) 930 is constituted by a switch matrix internal bus 940 for expanding input data to an inner part of the switch matrix, selectors (SEL) 941-1 to 941-10, 942-1 to 942-8 and 943-1 to 943-8 having an output mask which serve to mask and select output data corresponding to the contents of a crossbar control bus 938 generated in quasi-static by means of a crossbar control unit 937 based on the configuration data of a crossbar switch, and output masks (MSK) 944-1 to 944-8 for masking predetermined input data, which is not particularly restricted. The selectors 941, 942 and 943 having an output mask may have such a structure as to independently select one of all inputs respectively or such a structure as to select one of a part of the inputs or to limit to freely select a predetermined one of the inputs, thereby reducing a mounting area on a semiconductor chip. The output masks (MSK) 944-1 to 944-8 limit an output from the output port 860 to an input from the load store cell 804. Since a connecting destination is not limited for the input from the input port, actual harm is not caused. The reason is that the mounting area on the semiconductor chip is to be reduced.

In the example shown in FIG. 13, the connecting path of the crossbar switch is determined in quasi-static based on the configuration data. Therefore, note that the configuration data are to be changed when the path is to be changed.

Figure 14:
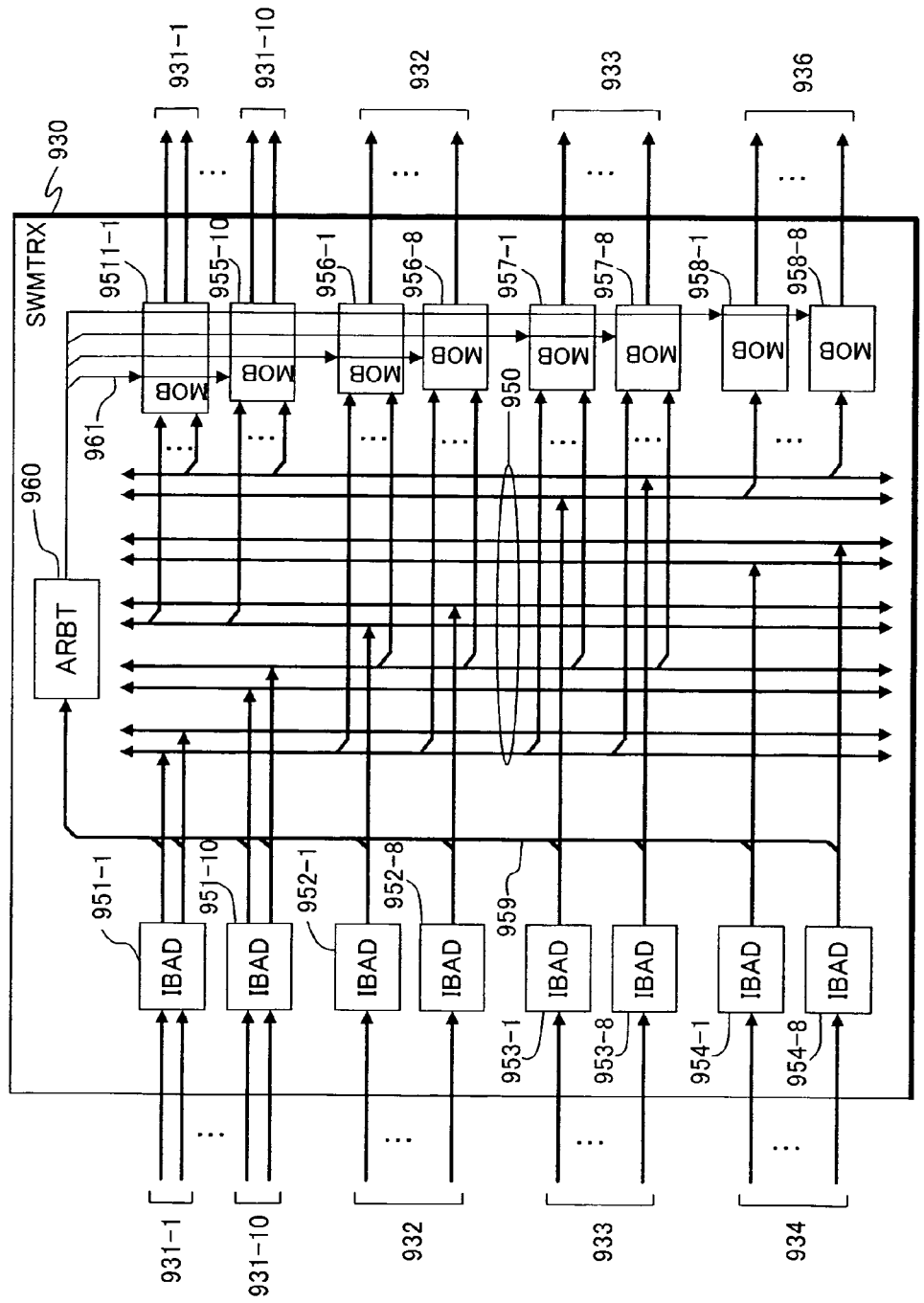
FIG. 14 is a block diagram showing a second example of the switch matrix.

FIG. 14 shows a second example (dynamic structure) of the switch matrix. The switch matrix (SWMTRX) 930 is constituted by a switch matrix internal bus 950 for expanding input data into the switch matrix, matrix input buffer/address predecoders (IBAD) 951-1 to 951-10, 952-1 to 952-8, 953-1 to 953-8, and 954-1 to 954-8 for embedding response destination information of a response format in the input data if necessary, matrix output buffers (MOB) 955-1 to 955-10, 956-1 to 956-8, 957-1 to 957-8, and 958-1 to 958-8 for selecting and temporarily holding the output data corresponding to the contents of the matrix output buffer control bus 961, a predecode result bus 959 for outputting a predecode result, and an internal bus arbiter (ARBT) 960 for outputting a predetermined control signal to the matrix output buffer control bus based on the contents of the predecode result bus 959, which is not particularly restricted. It is also possible to employ such a structure as to independently select an input to the matrix output buffer from all of the inputs respectively or such a structure as to limit to freely select one of a part of the inputs or only a predetermined one of the inputs, thereby reducing a mounting area on a semiconductor chip, which is not particularly restricted. Moreover, it is also possible to employ such a structure as to share the matrix input buffer and the switch matrix internal bus by a plurality of inputs, thereby reducing the mounting area on the semiconductor chip, which is not particularly restricted. In the example, the connecting path of the crossbar switch is dynamically determined by an access address. Therefore, the configuration data of the crossbar switch are not required.

Figure 15:
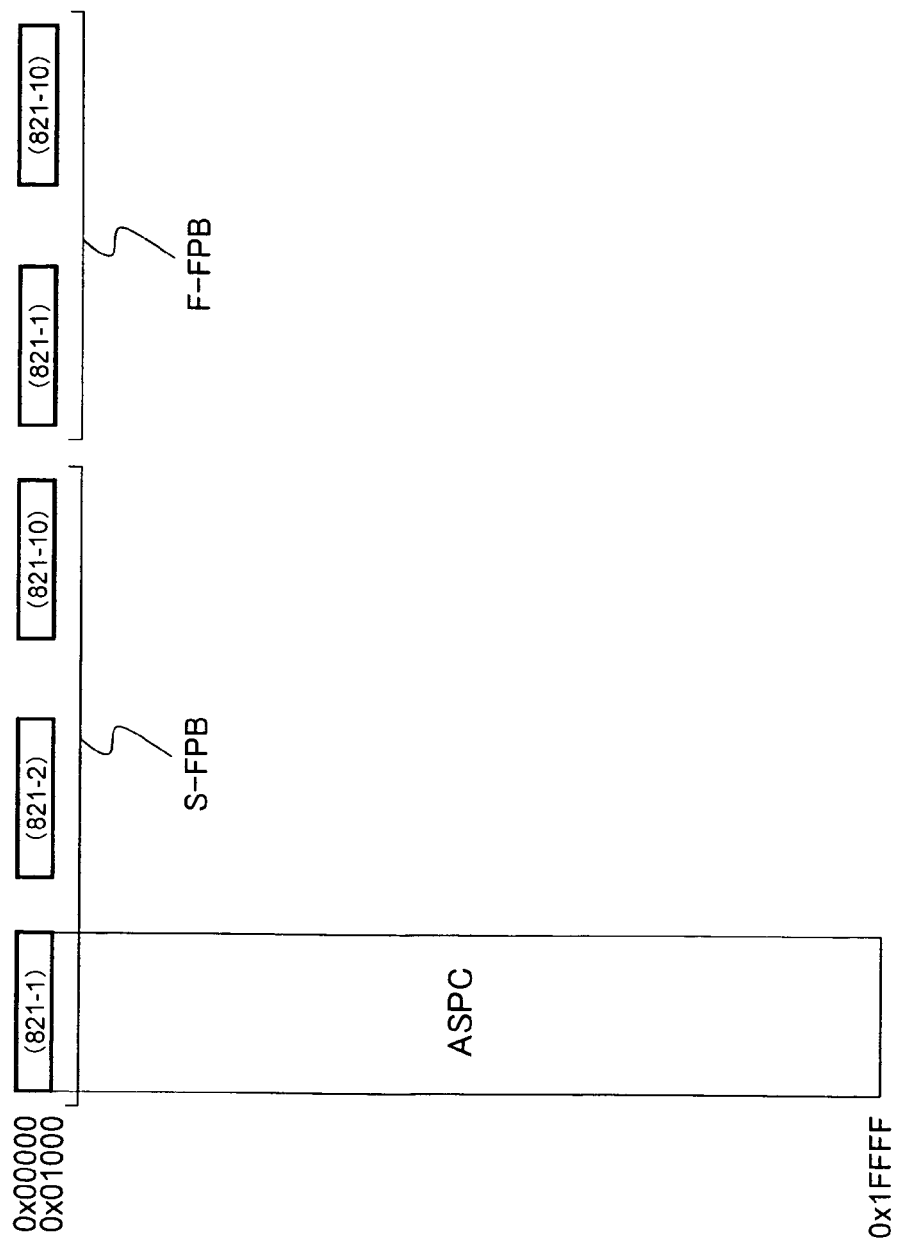
FIG. 15 is an address map showing an address space of each memory bank in a flexible processor block including a crossbar switch having a static structure.
Figure 16:
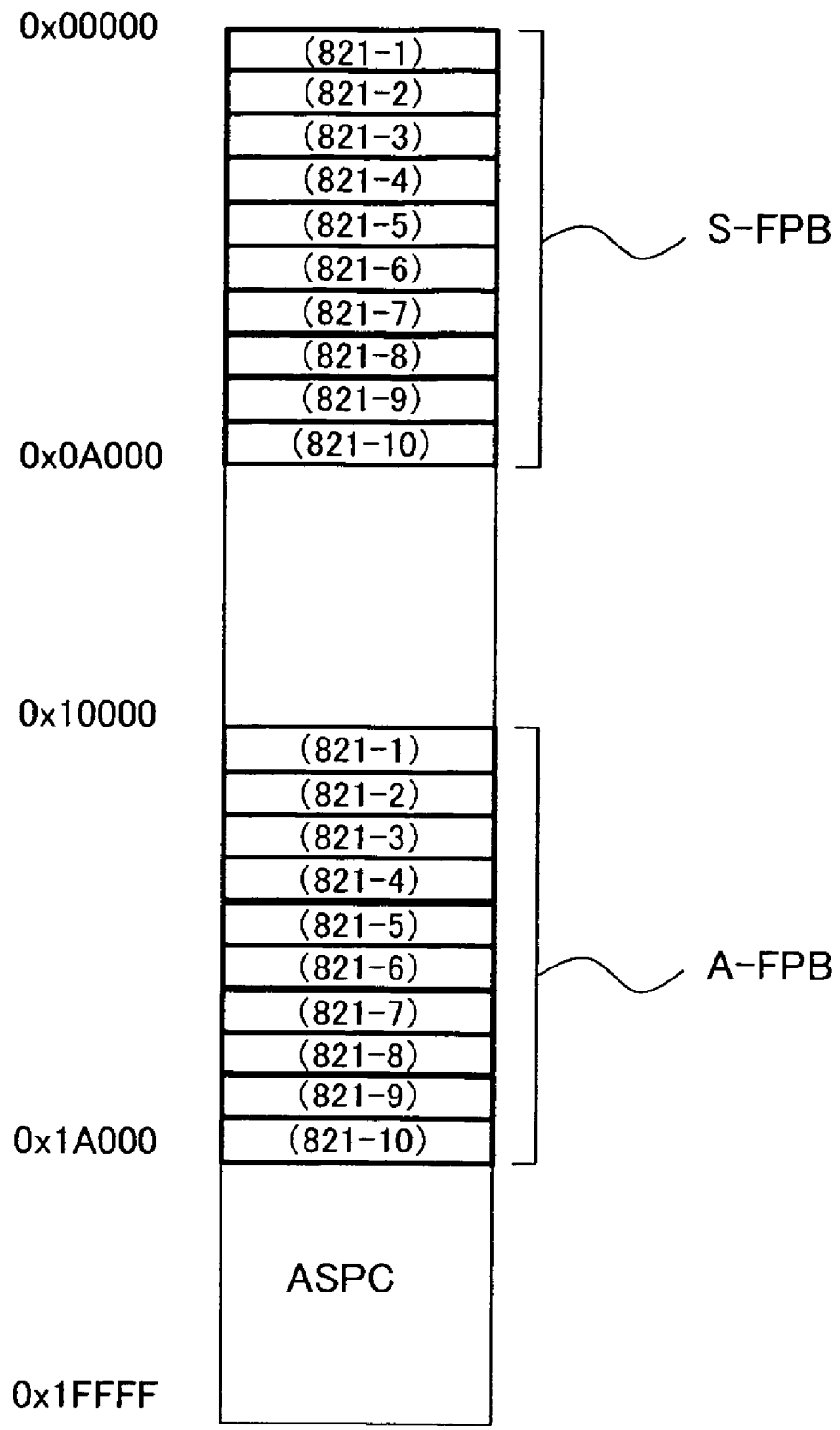
FIG. 16 is an address map showing the address space of each memory bank in the flexible processor block including the crossbar switch having a dynamic structure.

FIG. 15 shows an address space of each memory bank (MBNK) 821 in the flexible processor block (FPB) 450 including the crossbar switch 810 having a static structure. FIG. 16 shows an address space of each memory bank (MBNK) 821 in the flexible processor block (FPB) 450 including the crossbar switch 810 having a dynamic structure. It is possible to give access to the memory bank by specifying an address of an access destination memory bank as an address (LODADRS, STRADRS, LODADRS0, LODADRS1) of an address field of a request format shown in FIG. 11. In case of the static configuration, the access destination memory bank is determined by the configuration data of the crossbar switch 810. Therefore, the address spaces of all of the memory banks are degenerated into one as typically shown in FIG. 15. S-FPB implies bank memories 821-1 to 821-10 in the same flexible processor block. F-FPB implies bank memories 821-1 to 821-10 in the flexible processor block on a downstream side illustrated in FIG. 3. ASPC indicates an address space of the flexible processor.

On the other hand, in case of the dynamic configuration, the address spaces of the memory banks are different from each other as illustrated in FIG. 16, and furthermore, the address space of each memory bank in the adjacent flexible processor block is defined into a single address space in order to implement seamless memory access between the two adjacent flexible processor blocks connected to each other through an input/output port. S-FPB and ASPC have the same meaning as that in FIG. 15. A-FPB implies the bank memories 821-1 to 821-10 in the adjacent flexible processor block.

In order to execute a predetermined application in the data processor according to the invention, a plurality of tasks constituting the application is assigned to any of the main controller 200, the subcontroller 410, and flexible processor blocks 450-1 to 450-2 corresponding to respective processing contents and calculating characteristics and is mutually subjected to a linkage processing through the main memory 300 and the shared memory 440 so that a high application processing performance can be implemented.

At this time, the number of the calculating cells 801 to 804 in the calculating array 800 constituting the flexible processor block is limited and the scale of a task to be executed is not assigned to the single calculating array 800 in some cases. By dividing the task into a scale to be assigned to the single calculating array 800 and sequentially executing the divided task while updating the configuration data for defining the contents of the operation of the flexible processor block 450, therefore, it is possible to process the whole task in small scale hardware. On the other hand, it is desirable to constitute the flexible processor block 450 in order to have a feature that a processing performance can be enhanced scalably for a hardware scale and the development period of the data processing system can be shortened by the reutilization of conventional software in previous consideration of the case in which the hardware scale of the flexible processor can be increased for the reason of the utilization of a finer semiconductor manufacturing process in the future.

The inventor investigated a method of applying the input/output ports 850 and 860 provided in the flexible processor block 450 and couples the flexible processor blocks 450 through the input/output ports 850 and 860, and thus found a new value which will be illustrated and described below.

For example, it is assumed that there are a task 1 (TSK1) and a task 2 (TSK2) as tasks to be executed by the flexible processor 400, and the task 1 is executed by continuously processing a subtask A (SUBTSKA) and a subtask B (SUBTSKB) respectively and the task 2 is executed by continuously processing the subtask A (SUBTSKA) and a subtask C (SUBTSKC) respectively. It is assumed that the subtask A, the subtask B and the subtask C have a scale which can be assigned to the (current) flexible processor block 450, respectively.

Figure 17:
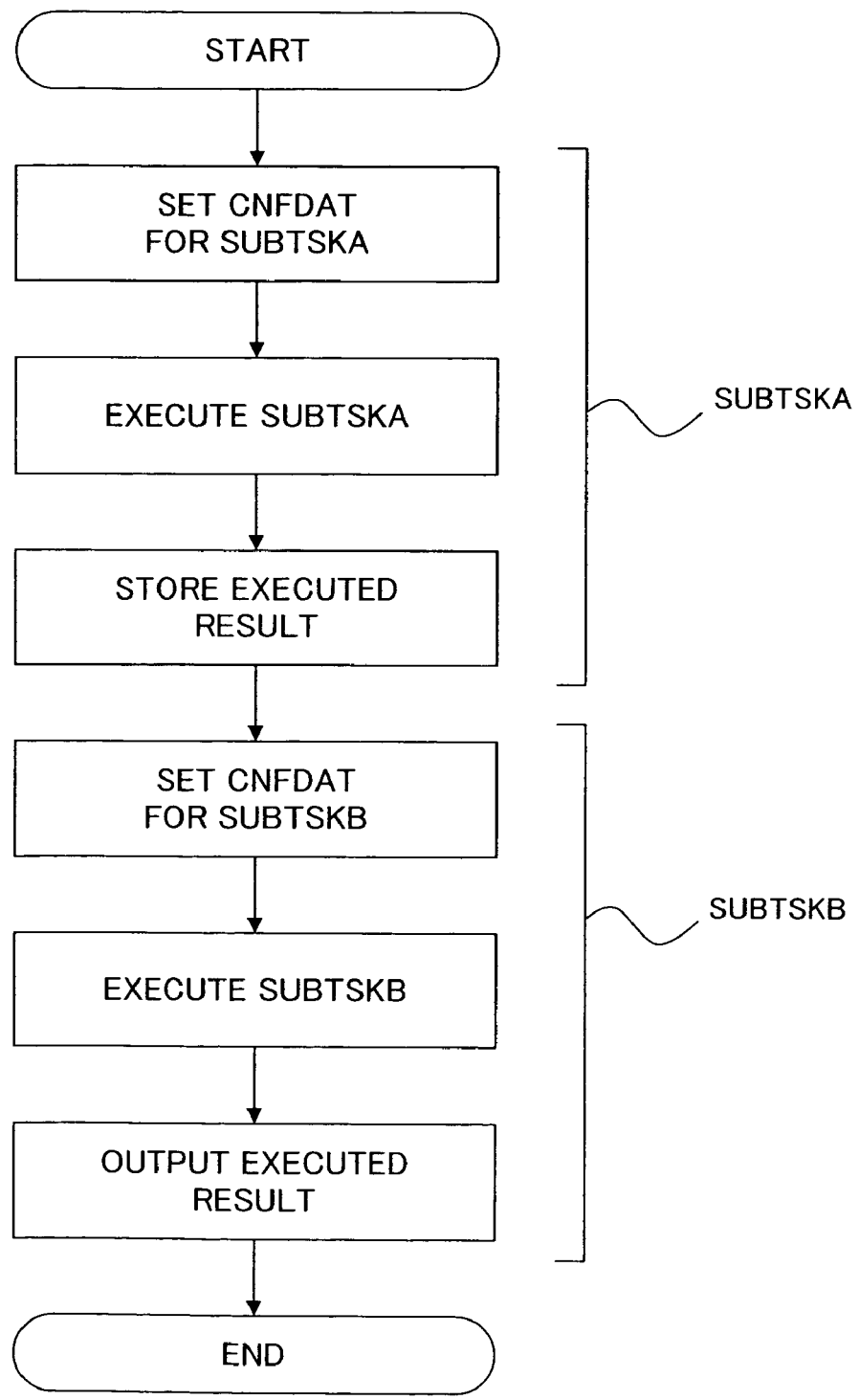
FIG. 17 is a flowchart showing a processing flow of a task 1 (TSK1) using a flexible processor block.
Figure 18:
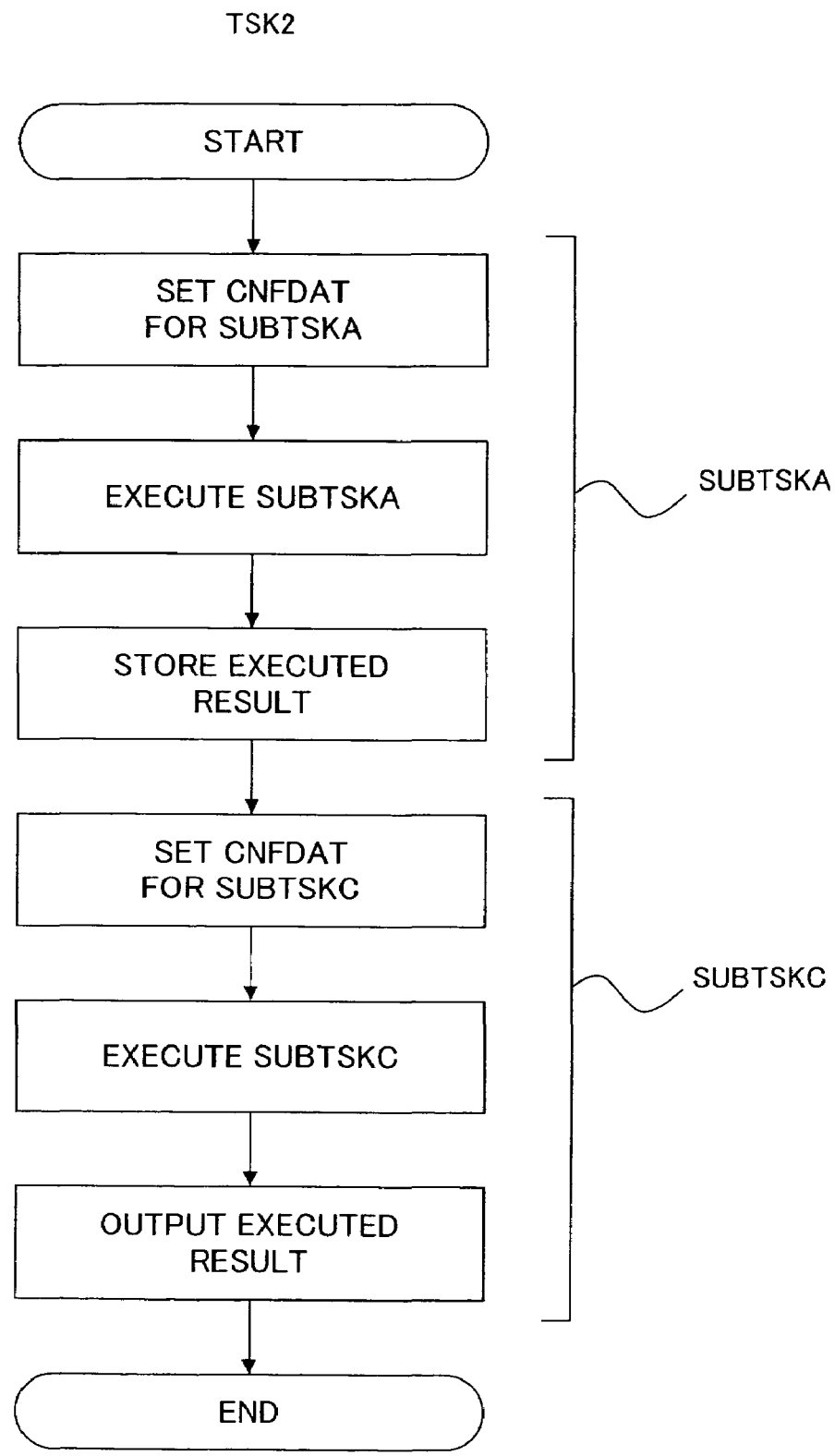
FIG. 18 is a flowchart showing a processing flow of a task 2 (TSK2) using a flexible processor block.

FIG. 17 shows a processing flow of the task 1 (TSK1) using one flexible processor block and FIG. 18 shows a processing flow of the task 2 (TSK2) using the flexible processor block. For example, there is shown the case in which the tasks 1 and 2 are executed by using the flexible processor block 450-1 of FIG. 2, for example. It is assumed that the task 1 is executed by processing the subtask A (SUBTSKA) and the subtask B (SUBTSKB) in series and the task 2 is executed by processing the subtask A (SUBTSKA) and the subtask C (SUBTSKC) in series. For example, all results of the execution of the subtask A (SUBTSKA) are degenerated into the local memory 820 in FIG. 17 and the processing of the subtask B (SUBTSKB) is then carried out by using the result of the execution which is thus degenerated. The case of FIG. 18 is the same.

Figure 19:
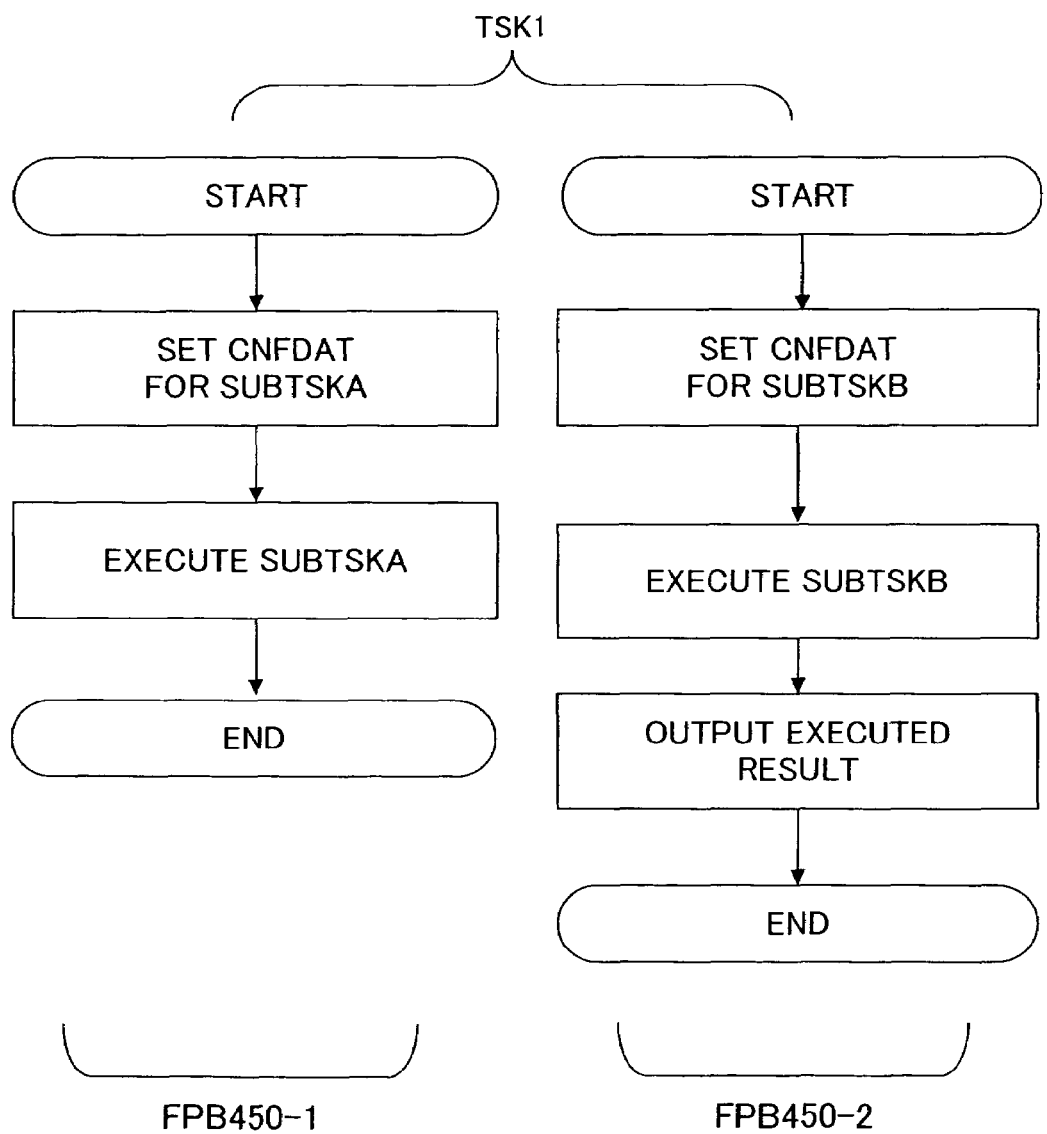
FIG. 19 is a flowchart showing the processing flow of the task 1 (TSK1) using two flexible processor blocks coupled in the manner of FIG. 3.
Figure 20:
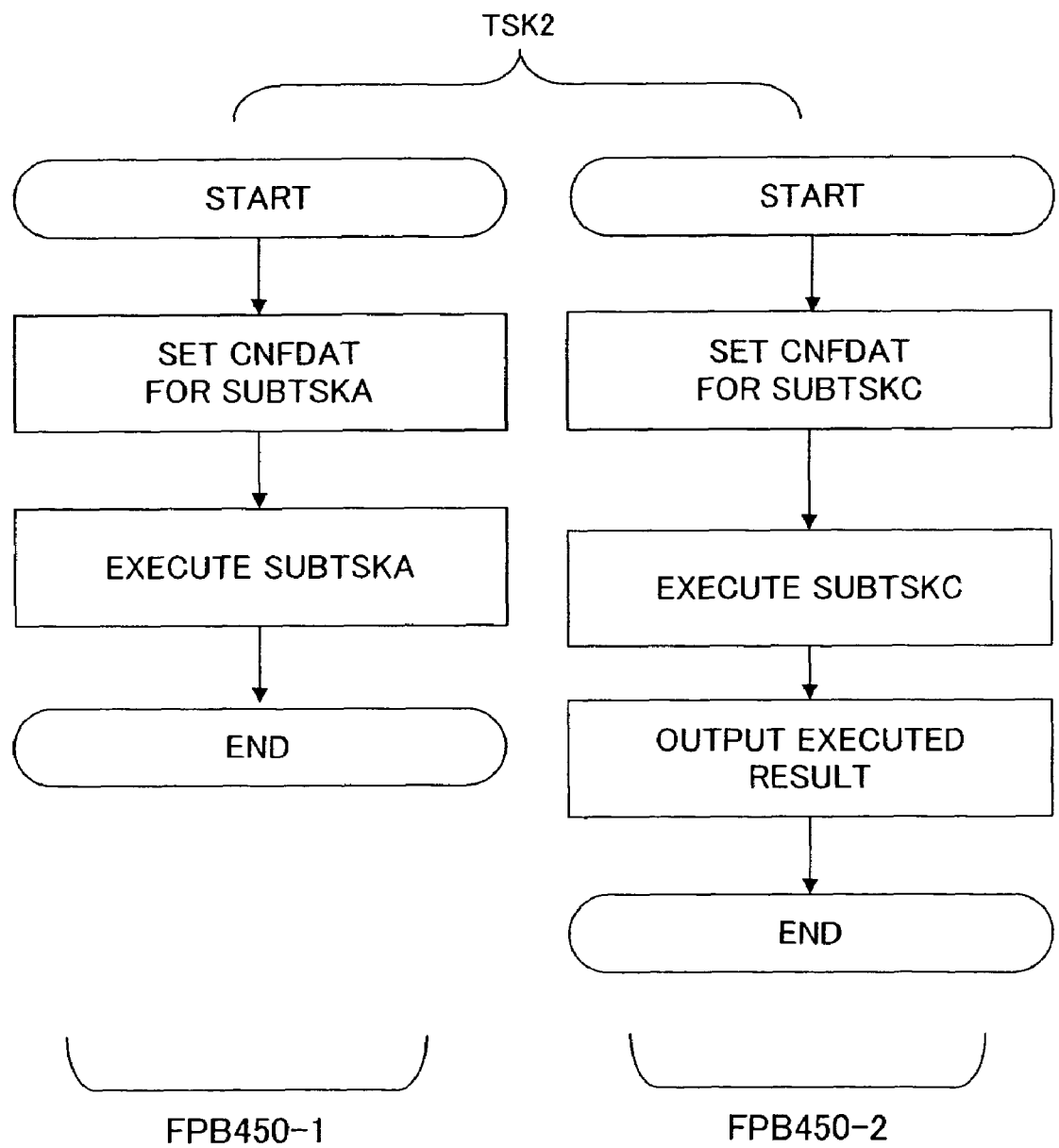
FIG. 20 is a flowchart showing the processing flow of the task 2 (TSK2) using two flexible processor blocks coupled in the manner of FIG. 3.

FIG. 19 shows a processing flow of the task 1 (TSK1) using two flexible processor blocks 450-1 and 450-2 coupled in the manner of FIG. 3. FIG. 20 shows a processing flow of the task 2 (TSK2) using the two flexible processor blocks 450-1 and 450-2 coupled in the manner of FIG. 3. The task 1 is implemented by the execution of the subtask A (SUBTSKA) through the flexible processor block 450-1 and the execution of the subtask B (SUBTSKB) to be carried out in parallel with the processing of the subtask A upon sequential receipt of a result of a calculation obtained successively by the execution of the subtask A. As shown in FIG. 17, it is not necessary to carry out a transition to the processing of the subtask B after waiting for the degeneration of all the results of the execution of the subtask A (SUBTSKA) into the local memory 820. A so-called pipeline processing can also be carried out between a plurality of flexible processor blocks. The case of FIG. 20 is also the same.

Figure 21:
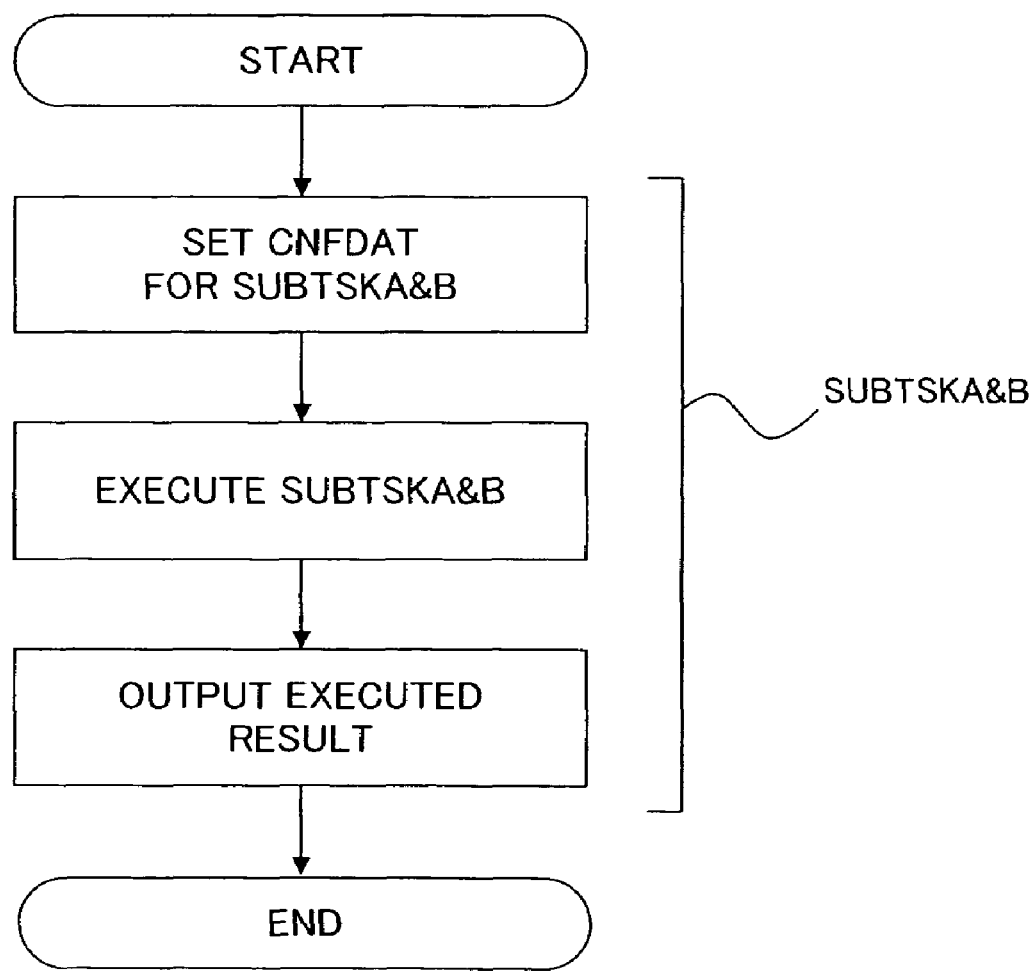
FIG. 21 is a flowchart showing the processing flow of the task 1 (TSK1) using a flexible processor block in which the number of cells in a calculating array is doubled.
Figure 22:
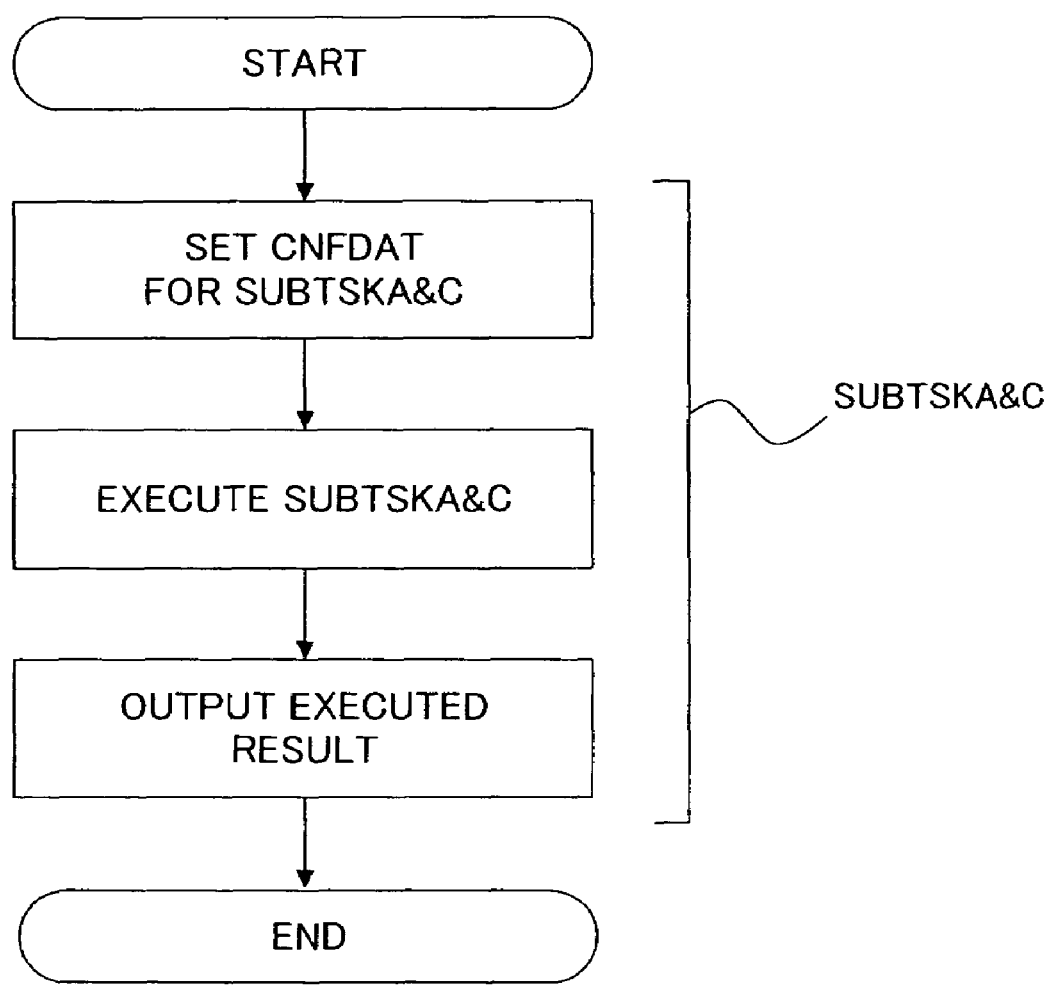
FIG. 22 is a flowchart showing the processing flow of the task 2 (TSK2) using the flexible processor block in which the number of cells in the calculating array is doubled.
Figure 23:
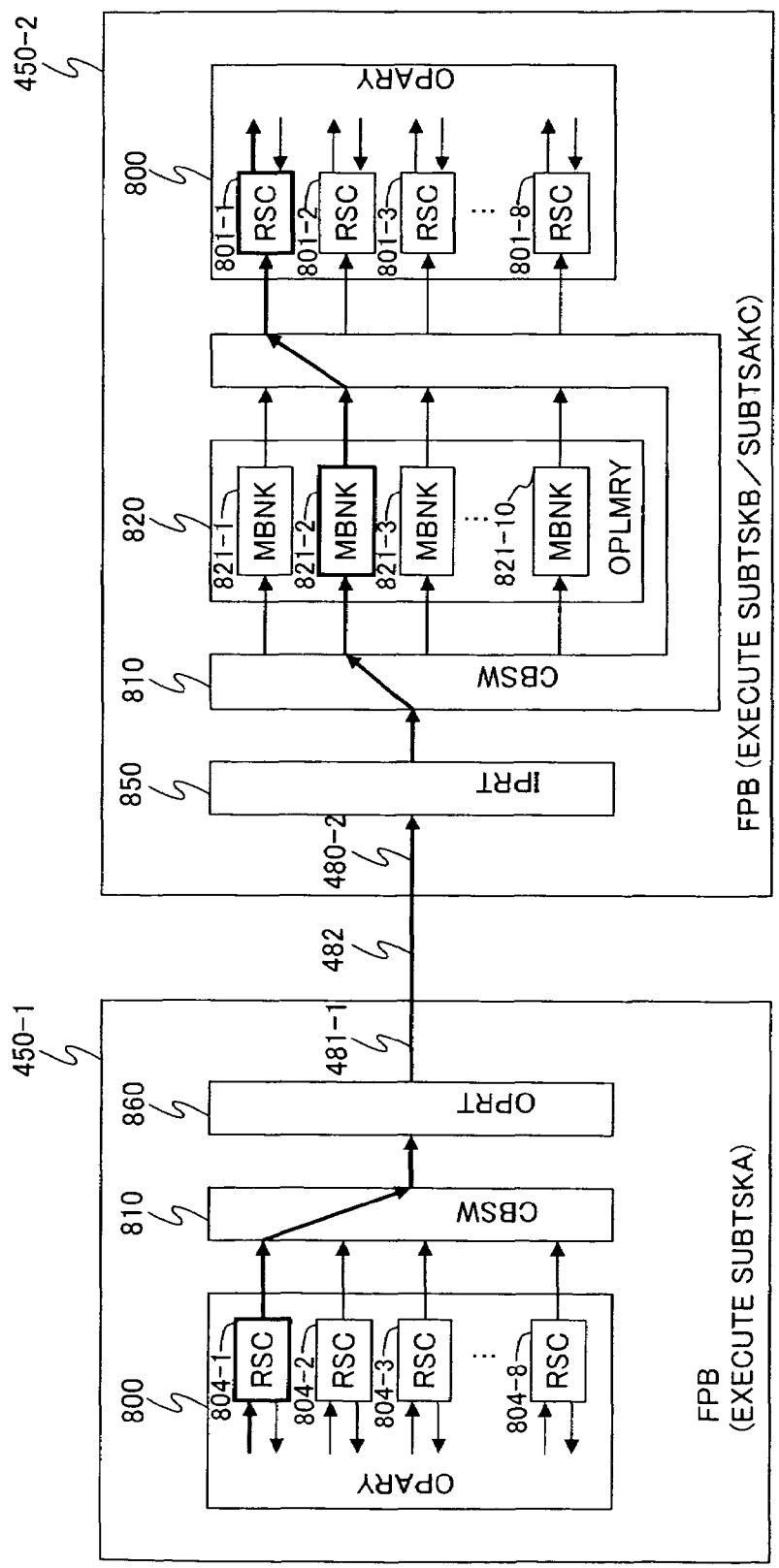
FIG. 23 is a block diagram showing that two flexible processor blocks are coupled to each other and a result of an execution of the task is transferred between blocks via an input/output port and a pipeline processing can be thus carried out over a subtask.

FIG. 21 shows the processing flow of the task 1 (TSK1) using one flexible processor block in which the number of the cells 801 to 804 in the calculating array 800 is doubled. FIG. 22 shows the processing flow of the task 2 (TSK2) using the flexible processor block in which the number of the cells 801 to 804 in the calculating array 800 is doubled. FIG. 23 shows that two flexible processor blocks are coupled to each other and the result of the execution of the task is transferred between the blocks via the input/output port, and the subtask can be thus subjected to the pipeline processing.

The processing performance in FIGS. 19 and 20 is almost the same as that of FIGS. 21 and 22, and both of the processing performances are scalably enhanced for a hardware scale in the case in which the execution time of each subtask is properly regulated. However, the configuration data of the flexible processor block optimized for each subtask can be reused in FIGS. 19 and 20, while configuration data about the task 1 (SUBTSKA&B) coupling the subtask A and the subtask B and the task 2 (SUBTSKA&C) coupling the subtask A and the subtask C are to be wholly regulated again and software cannot be reused on a restriction related to a data transfer in the calculating array 800 in FIGS. 21 and 22. From the foregoing, the flexible processor blocks are used through a series connection as is illustrated in FIGS. 3 and 23. Consequently, it is apparent that the processing performance can be scalably enhanced for the hardware scale, and at the same time, a software reusability on a flexible processor block unit can be implemented.

From the foregoing, it is possible to implement a practical flexible processor. More specifically, the load store interfaces 801 and 804, the memory bank 821 and the input/output ports 850 and 860 are connected to each other through the crossbar switch 810 so that a data transfer having a high flexibility can be carried out therebetween. Consequently, it is possible to reduce an overhead accompanied by a data transfer and to enhance the utilization efficiency of each calculating cell and the data processing performance of the flexible processor block. Moreover, a plurality of flexible processor blocks is coupled through the input/output port and the task is linked and processed between the blocks. Consequently, it is possible to implement a flexible processor capable of scalably enhancing a processing performance for a hardware scale while maintaining a software reusability on a block unit.

While the invention made by the inventor has been specifically described above based on one embodiment, it is apparent that the invention is not restricted thereto but various changes can be made without departing from the scope thereof.

For example, the number of connecting stages in the series connection of the flexible processor blocks is not restricted to two but may be more. Furthermore, a plurality of flexible processor blocks may be connected like a ring. Moreover, it is apparent that the flexible processor can be singly implemented as one semiconductor integrated circuit. Furthermore, an address, data and a control signal may be multiplexed to get on a bus.

Next, another preferred embodiment of the invention will be described with reference to the accompanying drawings. A circuit unit constituting a flexible data processor according to an embodiment is formed on a semiconductor substrate such as single crystal silicon by a semiconductor integrated circuit technique such as a well-known CMOS (complementary type MOS transistor) or bipolar transistor, which is not particularly restricted.

Figure 25:
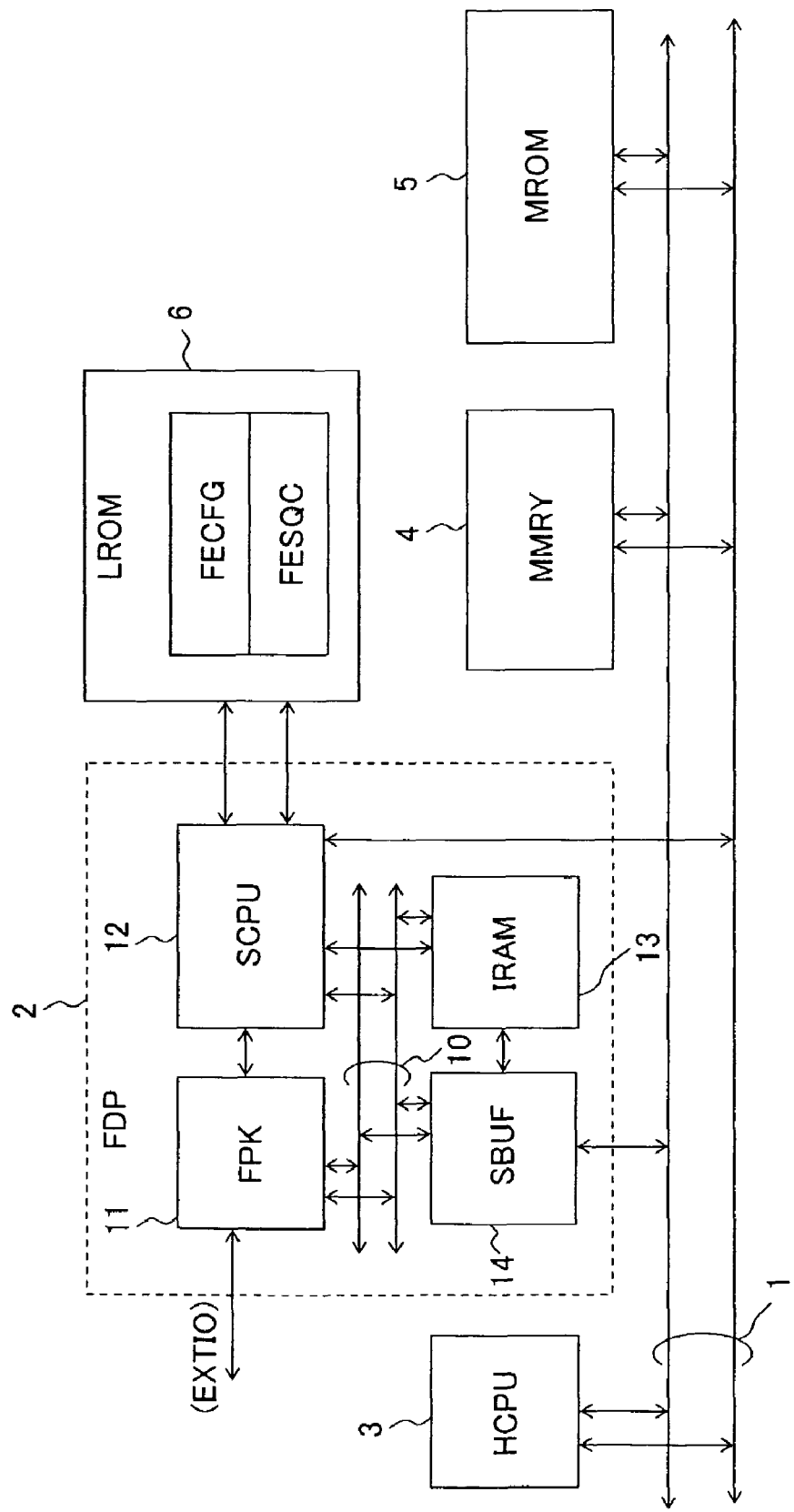
FIG. 25 is a block diagram showing an example of a data processing system.

FIG. 25 shows an example of the data processing system. The data processing system has a flexible data processor (FDP) 1002 connected to a system bus 1001, a host processor (HCPU) 1003, a main memory (MMRY) 1004 and a main ROM (MROM) 1005. A local ROM (LROM) 1006 is connected to the flexible data processor (FDP) 1002.

The flexible data processor (FDP) 1002 has a flexible processor kernel (FPK) 1011 connected to the internal bus 1010 in common, a sub CPU (SCPU) 1012, an internal RAM (IRAM) 1013 and a shared buffer (SBUF) 1014. The flexible data processor 1002 is positioned as an accelerator for the host processor 1003. In the flexible processor 1002, a logical function specialized in a specific processing such as a voice processing, an image processing or a protocol processing is set programmably by configuration data (FECFG). A processing order for the set logical function is controlled by sequence information (FESQC). The configuration data (FECFG) and the sequence information (FESQC) are retained in the local ROM 6. An access control for the local ROM 1006 is carried out by the sub CPU 1012. The sub CPU 1012 acquires the configuration data (FECFG) and the sequence information (FESQC) from the local ROM 1006 in accordance with a control program loaded into the internal RAM 1013 and gives the acquired information to the flexible processor kernel 1011 in accordance with a predetermined timing. Consequently, the flexible processor kernel 1011 carries out a data processing based a logical function specified by the configuration data (FECFG). The sub CPU 1012 internally transfers necessary calculation data for a data processing from the internal RAM 1013 or the shared buffer 1014 to the flexible processor kernel 1011. The flexible processor kernel 1011 carries out a data processing using the calculation data. The sub CPU 1012 fetches a result of the data processing from the flexible processor kernel 1011 in a predetermined timing and transfers the same result to the internal RAM 1013 or the shared buffer 1014. The flexible processor kernel 1011 can also input/output calculation data through an external input/output circuit (EXTIO). Moreover, the sub CPU 1012 can also be interfaced directly through a system bus 1 and a port.

The flexible data processor (FDP) 1002 carries out an interface with the system bus 1001 through the shared buffer 1004 having a dual port. The shared buffer 1014 is shared between the sub CPU 1012 and the host processor 1003, and the sub CPU 1012 and the host processor 1003 transfer data or a program through the shared buffer 1014.

The host processor 1003 initially loads an operation program of the sub CPU 1012 from the main memory 1004 to the shared buffer 1014 in accordance with the host program of the main ROM 1005. The sub CPU 1012 directly fetches the initially loaded control program from a specific address of the shared buffer 1014 and executes the same program, for example, and can thereby start the control operation, which is not particularly restricted. Consequently, the sub CPU 1012 internally transfers necessary other programs from the shared buffer 1014 to a program region of the internal RAM 1013. The sub CPU 1012 internally transfers the calculation data transmitted to the shared buffer 1014 by the main processor 1003 to the flexible processor kernel 1011 and uses the same calculation data for the calculation of the flexible data processor (FDP) 1002. The sub CPU 1012 can internally transfer calculation result data obtained from the flexible data processor (FDP) 1002 to the shared buffer 1014, and the host CPU 1003 can fetch the transferred calculation data from the shared buffer 1014 and can use the same data for a further processing.

Figure 24:
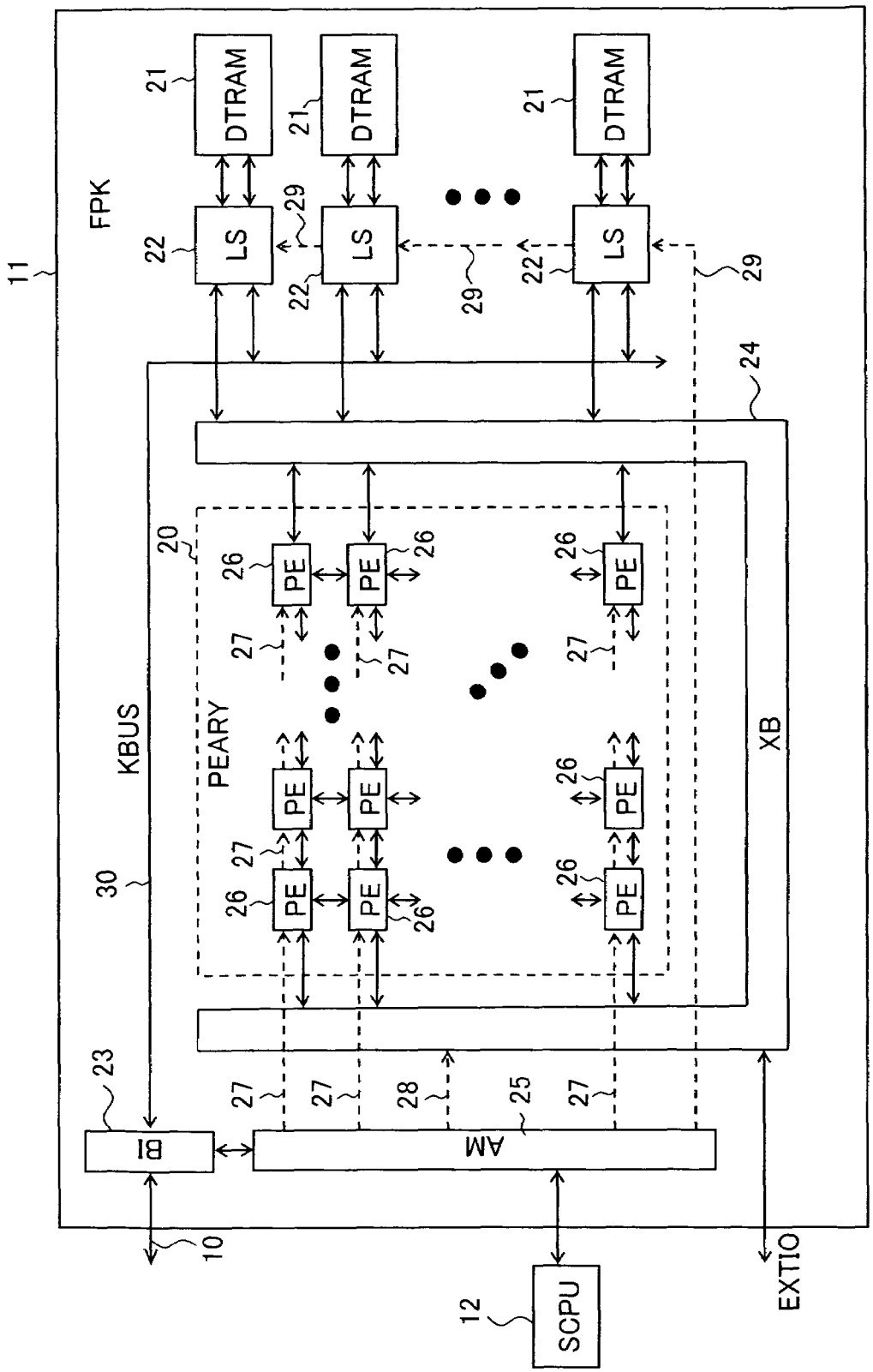
FIG. 24 is a block diagram showing an example of a flexible processor kernel.

FIG. 24 shows an example of the flexible processor kernel 1002. The flexible processor kernel 1002 comprises a calculating portion (PEARY) 1020, a plurality of data memories (DTRAM) 1021, a plurality of memory control circuits (LS) 1022, a bus interface portion (BI) 1023 to be an external interface portion, a crossbar switch portion (XB) 1024 and a control portion (AM) 1025. The calculating portion 1020 includes a plurality of calculating cells (PE) 1026 for executing a calculation, and their logical functions are defined based on configuration data (FECFG). The data memory 1021 has a plurality of access ports capable of being operated in parallel, for example, a dual port and holds the calculation data. Individual memory addresses are assigned to the data memories 1021. The memory control circuit 1022 recognizes the memory address assigned to the data memory 1021 corresponding thereto and controls access to the data memory 1021, and a control form thereof is defined based on the configuration data (FECFG). The bus interface portion 1023 is connected in common to each memory control circuit 1022 through a kernel bus (KBUS) 1030. The crossbar switch portion 1024 connects the calculating portion 1020 to the memory control circuit 1022 and a connecting form thereof is defined based on the configuration data (FECFG). The control portion 1025 transfers the configuration data (FECFG) to the calculating cell 1026, the memory control circuit 1022 and the crossbar switch portion 1024, and furthermore, supplies sequence information (FESQC) sequentially thereto in accordance with a predetermined timing. Consequently, the status transition of the calculating cell 1026, the memory control circuit 1022 and the crossbar switch portion 1024 is controlled and an operation thereof is thus controlled. 1027 denotes a transfer bus for transferring the configuration data (FECFG) and the sequence information (FESQC) to the calculating cell 1026. 1028 denotes a transfer bus for transferring the configuration data (FECFG) and the sequence information (FESQC) to the crossbar switch portion 1024. 1029 denotes a transfer bus for transferring the configuration data (FECFG) and the sequence information (FESQC) to the memory control portion 1022. The control portion 1025 transfers and controls the configuration data (FECFG) and the sequence information (FESQC) to the transfer buses 1027, 1028 and 1029 in series in accordance with an operation order, which is not particularly restricted.

The memory control circuit 1022 can accept a first access request from the bus interface portion 1023 to the data memory 1021 and a second access request from the calculating portion 1020 to the data memory 1021. In short, a plurality of data memories 1021 having a dual port can be accessed from the bus interface portion 1023 or the calculating portion 1020 through the memory control circuit 1022. It is not necessary to maintain a dedicated port for the data memory 1021 in order to connect the data memory 1021 to the bus interface portion 1023. Accordingly, the dual port of the data memory 1021 can be used for access from the bus interface portion 1023 and access from the calculating portion 1020. Consequently, an empty port in the load and store processing between the calculating portion 1020 and the data memory 1021 can be distributed into a transfer between the bus interface portion 1023 and the data memory 1021. Similarly, empty ports in a transfer processing of storing calculating object data in the data memory 1021 through the bus interface portion 1023 and a processing of transferring calculation result data from the data memory 1021 through the bus interface 1023 can be distributed into a transfer between the calculating portion 1020 and the data memory 1021. Thus, the bus interface portion 1023 is connected to the memory control circuit 1022 disposed between the data memory 1021 and the crossbar switch portion 1024. Therefore, it is possible to enhance a data transfer performance between the bus interface portion 1023, the data memory 1021 and the calculating portion 1020 without increasing the number of the ports of the data memory 1021. Furthermore, the memory control circuit 1022 can vary an access response control procedure for responding to the first access request and the second access request based on the configuration data. The access response control procedure for responding to the first access request and the second access request can be changed dynamically based on the configuration data. Consequently, it is possible to increase the degree of freedom for maximizing a data transfer rate together with the data memory 1021 corresponding to the contents of a calculation processing and the situation of the calculation processing in the calculating portion 1020, and furthermore, giving priority to the access of the data memory 1021 for a specific processing. Thus, it is also possible to enhance a data processing performance in the calculating portion 1020.

The calculating cell 1026 has a calculating performance which is almost identical to that of an arithmetic logic calculating unit in a general processor, and a data transfer can be carried out at a high operating frequency limited between four adjacent cells in four directions, that is, vertical and transverse directions respectively by a mutual connection only between the adjacent cells, which is not particularly restricted. If only the input/output interface of the calculating cell is unified, the function does not need to be single. It is sufficient that a calculating cell capable of executing only an addition or subtraction and a calculating cell capable of executing only a cumulative calculation are disposed in an optimum pattern corresponding to a calculating characteristic of a task to be executed, for example. As compared with the case in which a calculating cell of a single type capable of executing all of the calculations is disposed, consequently, it is possible to reduce an area on a semiconductor chip more greatly and to implement a calculating array having a higher calculating performance per area. Furthermore, it is apparent that the number of the calculating cells in the vertical and transverse directions can be set optionally by a required cost and calculating performance.

Figure 26:
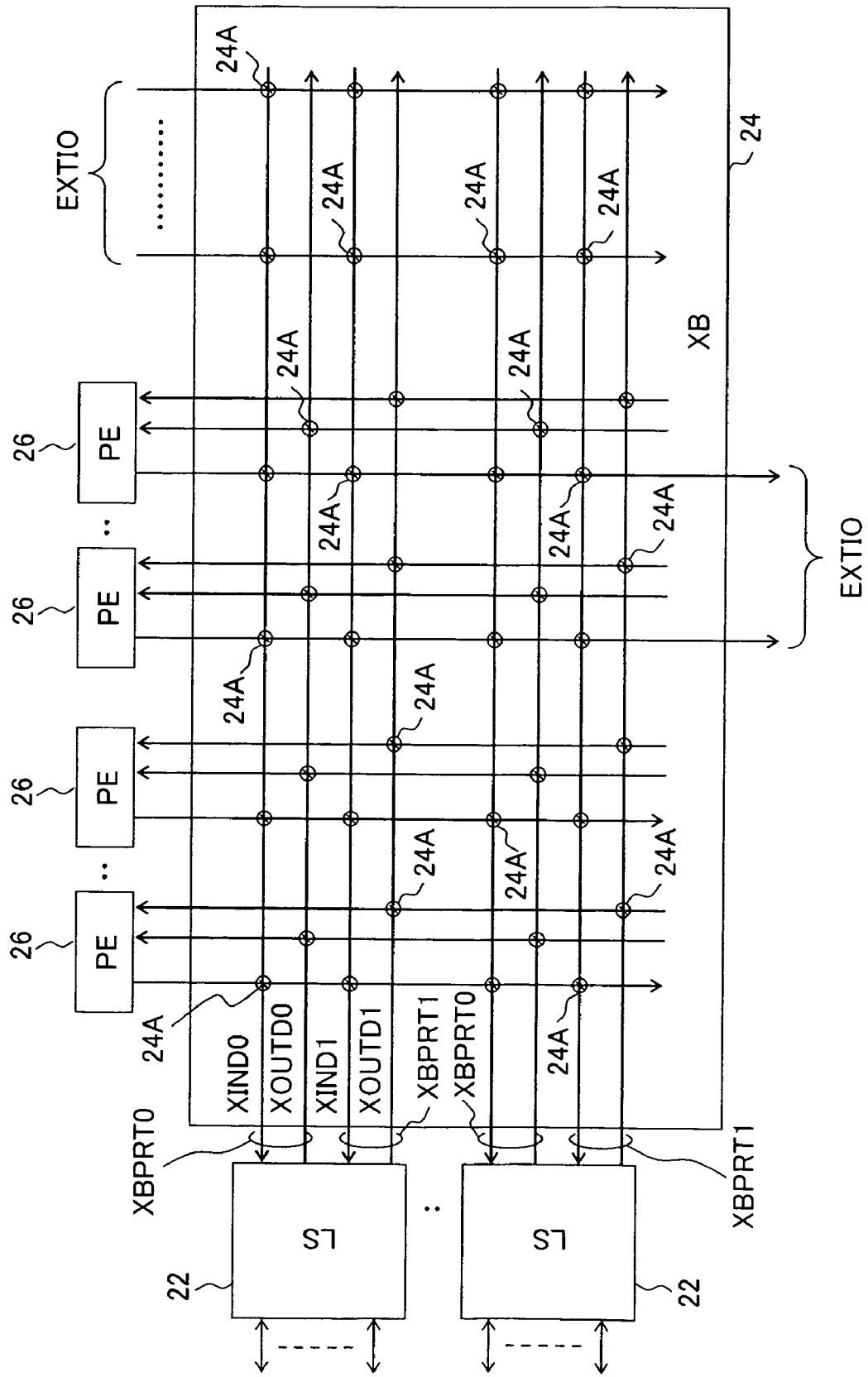
FIG. 26 is a block diagram showing an example of a crossbar switch portion.

FIG. 26 shows an example of the crossbar switch portion 1024. Herein, the crossbar switch portion 1024 has two ports XBPRT0 and XBPRT1 corresponding to the memory control circuit 1022. An input signal line XIND0 and an output signal line XOUTD0 are provided on each of the ports XBPRT0 and XBPRT1 in a transverse direction. A signal line is provided in a vertical direction to cross the input signal line XIND0 and the output signal line XOUTD0 in the vertical direction. The signal line in the vertical direction is connected to the calculating cell 1026 which is adjacent to the crossbar switch portion 1024. A part of the signal lines in the vertical direction is set to be a signal line to be connected to EXTIO. A selecting switch 1024A for selectively causing vertical and transverse corresponding signal lines to be conductive/nonconductive is disposed in a crossing position of the signal line in the vertical direction and that in the transverse direction. Any of the selecting switches 1024A which is caused to be conductive/nonconductive is determined by configuration data (FECFG).

An instruction and data are supplied from the calculating cell (PE) 1026 to the input signal lines XIND0 and XIND1 in a predetermined request format. For example, a store request format for the data memory 1021 includes a predetermined instruction code, store memory address and store data. A load request includes a predetermined instruction code and load data. A response header in a response format to a request format and load data are returned from the memory control circuit 1022 to the output signal lines XOUTD0 and XOUTD1.

Figure 27:
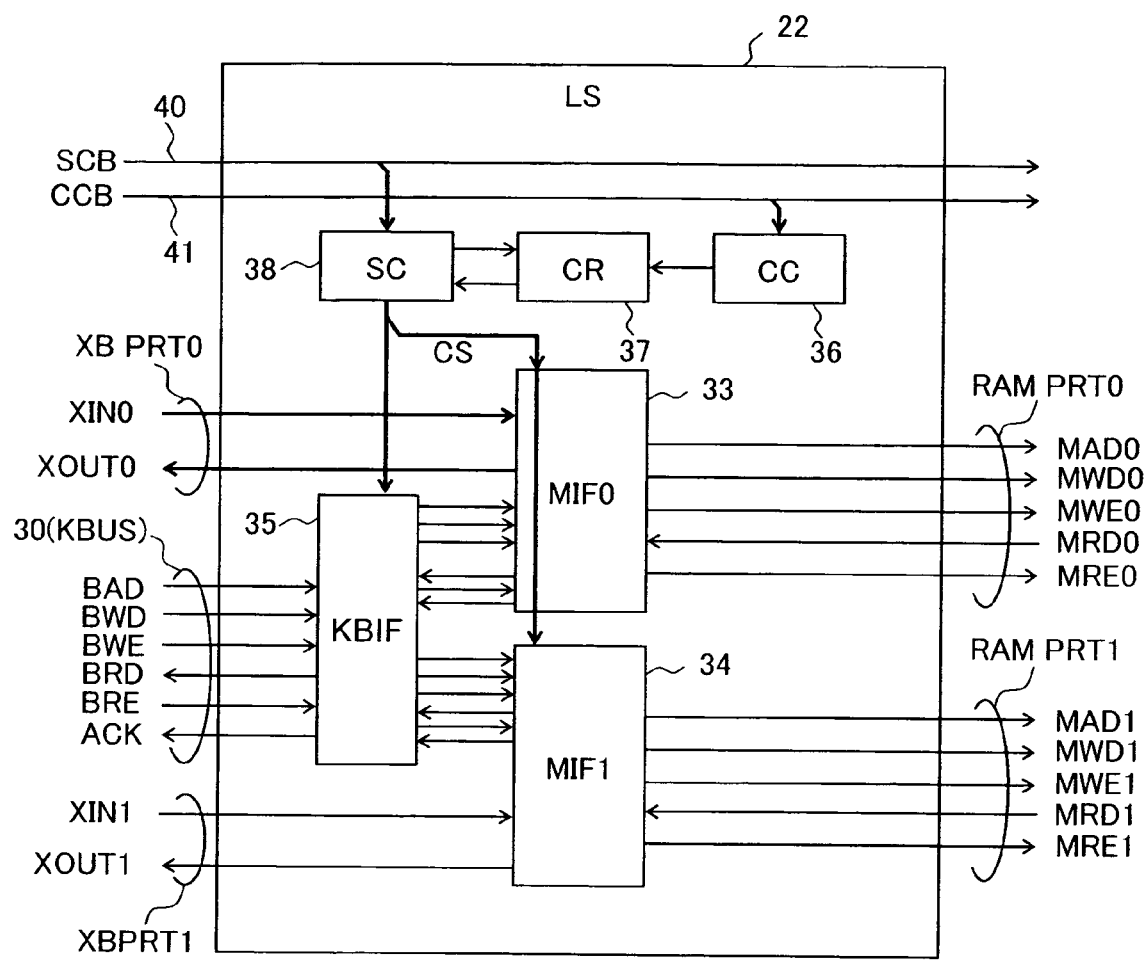
FIG. 27 is a block diagram showing an example of a memory control circuit.

FIG. 27 shows an example of the memory control circuit 1022. The memory control circuit 1022 has two memory port interface circuits (MIF0 and MIF1) 1033 and 1034 provided corresponding to access ports RAMPRT0 and RAMPRT1 of the data memory 1021, and a kernel bus interface circuit (KBIF) 1035 to be connected to the kernel bus (KBUS) 1030.

The access port RAMPRT0 of the data memory 1021 has interface terminals of output signals of a memory address MAD0, 16-bit write data MWD0, a write enable signal MWE0 and a read enable signal MRE0 and an input signal of 16-bit read data MRD0. Similarly, the other access port RAMPRT1 of the data memory 1021 has interface terminals of output signals of a memory address MAD1, 16-bit write data MWD1, a write enable signal MWE1 and a read enable signal MRE1 and an input signal of 16-bit read data MRD1. The kernel bus (KBUS) 1030 has bus signal lines of input signals of a memory address BAD, 16-bit write data BWD, a write enable signal BWE and a read enable signal BRE and output signals of 16-bit read data BRD and an acknowledge signal ACK. The number of parallel bits of the read data and the write data can be properly changed without a restriction to the foregoing. As is apparent from FIG. 24, a plurality of memory control circuits 1022 is connected to the kernel bus 1030 in common. The acknowledge signal ACK is asserted in a state in which an access request to the data memory 1021 is accepted and is maintained in a negate state in which the access request is not accepted.

The kernel bus interface circuit 1035 detects the presence of the access request to the data memory 1021 from the kernel bus 1030. For the detection, a result of decoding of the memory address BAD is used, for example. If the result of decoding is a mapping address of the corresponding data memory 1021, it is decided that the access request is given. When detecting the access request from the kernel bus 1030, the kernel bus interface circuit 1035 transmits the access request from the kernel bus 1030 to the memory port interface circuit (MIF0) 1033 or the memory port interface circuit (MIF1) 1034 or rejects a transmission to both of them in accordance with an instruction based on the configuration data (FECFG).

The memory port interface circuit 1033 is connected to the access port RAMPRT0 of the data memory 1021, the port XBPRT0 of the crossbar switch portion 1024, and the kernel bus interface circuit 1035. The memory port interface circuit 1033 detects the presence of the access request from the kernel bus 1030 to the access port RAMPRT0 and the presence of the access request from the port XBPRT0 of the crossbar switch portion 1024. The detection for the former case is carried out depending on whether the read enable signal RE or the write enable signal WE to be transmitted from the kernel bus interface circuit 1035 is activated or not. In the detection for the latter case, for example, a result of an analysis for an instruction in a predetermined request format supplied through the input signal line XIND0 is used. The memory port interface circuit 1033 carries out an interface control in accordance with a predetermined procedure determined by the configuration data (FECFG) when detecting the access request. In accordance with the interface control, the kernel bus (KBUS) 1030 or the corresponding port XBPRT0 is connected to the corresponding port RAMPRT0 of the data memory 1021 or rejects the access request. When the memory port interface circuit 1033 connects a kernel bus to the corresponding port RAMPRT0 of the data memory 1021 in response to an access request given from the kernel bus 1030 and permits the access of the data memory 1021, the acknowledge signal ACK is asserted and is returned to the kernel bus. When a response to the access request sent from the kernel bus 1030 is not given, the acknowledge signal ACK is maintained in a negate state. In the case in which access is given to the data memory 1021 from the port RAMPRT0 in response to the access request given from the port XBPRT0, the memory port interface circuit 1033 returns, from the XOUT0 to the calculating cell 1026, a response format of read data in read access and a response format of a write completion in write access. In an interface between the port XBPRT0 and the port RAMPRT0, both bus control protocols are different from each other. Therefore, a protocol conversion is carried out.

The memory port interface circuit 1034 is connected to the access port RAMPRT1 of the data memory 1021, the port XBPRT1 of the crossbar switch portion 1024, and the kernel bus interface circuit 1035. The memory port interface circuit 1033 detects the presence of an access request given from the kernel bus 1030 to the access port RAMPRT1 and the presence of an access request given from the port XBPRT1 of the crossbar switch portion 1024. As described above, for the former case, the detection is carried out depending on whether a read enable signal RE or a write enable signal WE transmitted from the kernel bus interface circuit 1035 is activated or not. In the latter case, the detection is carried out by using a result of an analysis for an instruction in a predetermined request format supplied from the input signal line XIND1. When the memory port interface circuit 1034 detects the access request, an interface control is carried out in accordance with a predetermined procedure determined by the configuration data (FECFG). In accordance with the interface control, the kernel bus (KBUS) 1030 or the corresponding port XBPRT1 is connected to the corresponding port RAMPRT1 of the data memory 1021 or rejects the access request. When connecting the kernel bus to the corresponding port RAMPRT1 of the data memory 1021 and permitting the access of the data memory 1021 in response to the access request given from the kernel bus 1030, the memory port interface circuit 1034 asserts the acknowledge signal ACK and returns the same signal ACK to the kernel bus 1030. When the memory port interface circuit 1034 does not respond to the access request sent from the kernel bus 1030, the acknowledge signal ACK is maintained in a negate state. When access is given to the data memory 1021 from the port RAMPRT1 in response to the access request given from the port XBPRT1, a response format of read data in read access and a response format of a write completion in write access are returned from the XOUT1 to the calculating cell 1026. The protocol conversion is carried out in the same manner as described above.

The interface sequence control circuit (SC) 1038 outputs a control signal CS for determining an interface control form for the memory port interface circuits 1033 and 1034 and the kernel bus interface circuit 1035. An interface control sequence of the interface sequence control circuit (SC) 1038 is controlled by sequence control information (FESQC) supplied from the control portion 1025 to a sequence control bus (SCB) 1040. Necessary configuration data (FECFG) for an interface control are fetched from the configuration data register (CR) 1037. The configuration control circuit (CC) 1036 carries out such a control as to prefetch, into the configuration data register 1037, the configuration data (FECFG) supplied from the control portion 1025 to a configuration control bus (CCB) 1041. When the interface sequence control circuit (SC) 1038 carries out a transition of a control state, the prefetched configuration data (FECFG) are fetched from the configuration data register 1037 synchronously with a timing thereof. The sequence control bus (SCB) 1040 and the configuration control bus (CCB) 1041 are caused to correspond to the signal bus 1029 in FIG. 24 and are connected to the memory control circuit 1022 in common.

The interface control forms for the memory port interface circuits 1033 and 1034 and the kernel bus interface circuit 1035 include first to fourth control forms. In the first control form, an access request given from the kernel bus 1030 which is the first access request is accepted to cause one of access ports of the data memory 1021 to be available. In the second control form, an access request given from the port XBPRT0 or the port XBPRT1 which is a second access request is accepted to cause one of the access ports of the data memory 1021 to be available. In the third control form, the access request given from the port XBPRT0 and the access request given from the port XBPRT1 are accepted to cause different access ports of the data memory 1021 to be available. In the fourth control form, the first access request is accepted to cause one of the access ports of the data memory 1021 to be available and the second access request is accepted to cause the other access port of the data memory 1021 to be available.

In the first to fourth control forms, it is possible to select some control forms for arbitrating the access request given from the kernel bus 1030 and the access requests given from the ports XBPRT0 and XBPRT1 of the crossbar switch portion 1024, and the arbitration control form will be described.

In the first arbitration control form, when all of the access ports of the data memory 1021 are used in response to the second access request, the busy state is retuned to the bus interface portion 1023 in response to the first access request. The acknowledge signal ACK is maintained in the negate state for the first access request so that a notice of the busy state is given. More specifically, in the first arbitration control form, when the kernel bus interface circuit 1035 transmits the access request from the kernel bus 1030 to the memory port interface circuit 1033 or 1034, the memory port interface circuit 1033 or 1034 responding to the access request given from each of the ports XBPRT0 and XBPRT1 rejects the same access request and maintains the acknowledge signal ACK in the negate state. Alternatively, the kernel bus interface circuit 1035 rejects the same access request without transmitting the access request from the kernel bus 1030 to the memory port interface circuit 1033 or 1034. As a result, the acknowledge signal ACK is maintained in the negate state. By returning the busy state, a receiving side recognizes that the first access request is rejected. Consequently, it is possible to instantly take a countermeasure by inserting a weight or changing processing scheduling on the receiving side of the busy state.

In the second arbitration control form, when all of the access ports are used in response to the second access request, the busy state is returned to a request source for a second access request in response to the first access request. For example, a predetermined response format for giving a notice of an access stop is output from the port XBPRT0 or XBPRT1 so that a notice of the busy state is given. More specifically, in the second arbitration control form, when the kernel bus interface circuit 1035 transmits the access request from the kernel bus 1030 to the memory port interface circuit 1033 or 1034, the memory port interface circuit 1033 or 1034 receiving the access request actually stops starting of a new access cycle of the data memory 1021 responding to the access request given from the port XBPRT0 or XBPRT1 and outputs a predetermined response format for giving a notice of the access stop from the port XBPRT0 or XBPRT1. The response format may be accompanied by write data to be a write stopping object. By returning the busy state, the calculating cell 1026 to be the receiving side recognizes that the second access request is rejected. Consequently, it is possible to take a countermeasure by inserting the weight or changing the processing scheduling on the receiving side of the busy state.

In the second arbitration control form, the kernel bus interface circuit 1035 carries out a control for returning the busy state to an access request source to be connected to the memory port RAMPRT0 or RAMPRT1 having lower priority in accordance with the priority of the memory port RAMPRT0 and RAMPRT1. Consequently, it is possible to define the configuration data (FECFG) in order to utilize the memory port RAMPRT0 or RAMPRT1 having high priority for a data processing having high priority. Therefore, it is possible to prevent the data processing having high priority from being disturbed by the first access request.

Furthermore, the priority of the memory port RAMPRT0 and RAMPRT1 recognized by the kernel bus interface circuit 1035 maybe varied in accordance with the configuration data (FECFG) The degree of freedom of the control is increased.

In the third arbitration control form, when the first access request and the second access request conflict with each other, the access request having priority set to be higher is accepted preferentially. More specifically, the memory interface circuits 1033 and 1034 recognize a difference in the priority of the first access request given from the kernel bus 1030 and the second access request given from the calculating cell 1026. Accordingly, the memory interface circuits 1033 and 1034 preferentially accept the access request having the priority set to be higher when the first access request and the second access request conflict with each other. In some cases, consequently, it is more advantageous that the first or second access request has priority corresponding to the contents of the data processing or the situation of the progress of a calculation by the calculating cell 1026. It is possible to contribute to an enhancement in a data processing performance depending on the setting of the priority.

In the third arbitration control form, it is also preferable to set the priority of the first access request and the second access request separately for each of the memory ports RAMPRT0 and RAMPRT1. It is possible to carry out a further finer priority control. It is advantageous that the priority of the first access request and the second access request is varied in accordance with the configuration data (FECFG).

Figure 28:
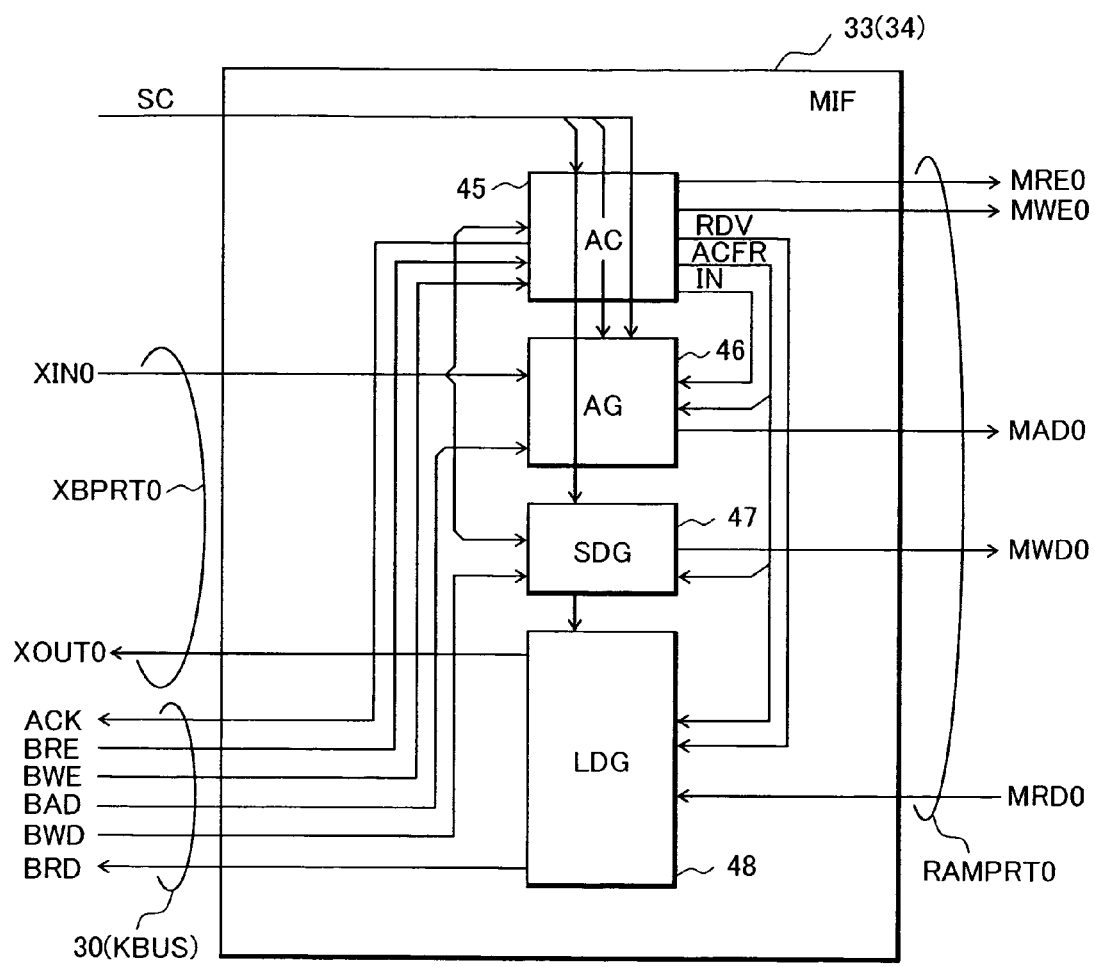
FIG. 28 is a block diagram showing an example of a memory port interface circuit.

FIG. 28 shows an example of the memory port interface circuit 1033. The memory port interface circuit 1033 has an access controller (AC) 1045, an address generator (AG) 1046, a store data generator (SDG) 1047 and a load data generator (LDG) 1048. The access controller 1045 detects an access request given from the kernel bus 1030 in response to a read enable signal RE or a write enable signal WE. The access controller 1045 detects an access request given from the port XBPRT0 from a code of a request format. The access controller 1045 asserts and returns the acknowledge signal ACK when it accepts the access request from the kernel bus, and maintains the acknowledge signal ACK in the negate state when it does not accept the same access request. The access controller 1045 returns a response format of an acceptance in write access and returns a response format of read data in read access when it accepts the access request from the port XBPRT0. The access controller 1045 returns a response format of an acceptance rejection when it does not accept the access request from the port XBPRT0. RDV denotes a code to be added to the response format.

The access controller 1045 carries out a control for the arbitration. The access controller 1045 recognizes a difference in the priority between the first access request given from the kernel bus 1030 and the second access request given from the calculating cell 1026 by the control signal SC. When the first access request and the second access request conflict with each other, the access request having the priority set to be higher is accepted preferentially. In that case, if an access request having priority set to be lower is accepted earlier, whether the end of an access cycle to respond to the access request having the priority set to be lower is waited is determined by the control signal SC. If the end is not waited, the access controller 1045 carries out the control operation described in the first arbitration control form or the second arbitration control form. The control signal ACFR is a connecting selection control signal of an access request source for connecting an accepted access request source to the memory port RAMPRT0.

An address supplied from BAD or XIN0 is preset to the address generator 1046, and the address generator 1046 outputs the address to MAD0 or outputs, to MAD0, an address obtained by incrementing the address as an initial value. A control signal IN is an increment indicating signal.

The store data generator (SDG) 1047 switches data transmitted from XIN0 or the data BWD and carries out a data alignment corresponding to a bus width of memory write data if necessary.

The load data generator (LDG) 1048 switches memory read data MRD0 into XOUT0 or the bus BRD and carries out a data alignment for output data if necessary.

The memory port interface circuit 1034 also has the same structure as that in FIG. 28, which is not shown.

While the invention made by the inventor has been specifically described above based on another embodiment, it is apparent that the invention is not restricted thereto but various changes can be made without departing from the scope thereof. For example, the recognition of the memory access from the kernel bus by the memory control circuit is not restricted to a technique based on an access address, a read enable signal and a write enable signal. Moreover, a response to an access request is not restricted to a structure using an acknowledge signal but a valid signal may be used or other response codes may be used. The interface with the calculating cell is not restricted to the structure using the response format. It is also possible to grasp a response format to be a packet having a predetermined format defined. The data memory is not restricted to a dual port. A multiport such as a triple port may be used. Moreover, it is also possible to employ, for the kernel bus, a bus protocol for multiplexing and transferring an address, data and a control signal. It is apparent that a flexible processor kernel can also be implemented as a semiconductor integrated circuit singly.

What is claimed is:

1. A data processor comprising:
    at least one processor block,
    wherein the processor block includes a calculating portion having a plurality of calculating units and capable of switching their connecting forms and functions, a local memory portion having a plurality of banks capable of being accessed in parallel, an external interface portion, a bus switch portion and a control portion,
    wherein a part of the calculating units in the calculating portion generates a load request of an operation operand to the other calculating units and a store request of a result of a calculation carried out by the other calculating units, and
    wherein the bus switch portion selects a connection among the calculating portion, the local memory portion and the external interface portion.

2. The data processor according to claim 1,
    wherein the control portion determines a connecting form and a function of the calculating unit for the calculating portion, and the control portion determines a connecting form by the bus switch portion.

3. The data processor according to claim 1,
    wherein the control portion determines a connecting form and a function of the calculating unit for the calculating portion, and the bus switch portion determines a connecting form corresponding to an access address.

4. The data processor according to claim 1,
    wherein the calculating portion has a plurality of first calculating units disposed in a matrix, and a second calculating unit disposed between the first calculating units and the bus switch portion, and
    wherein the second calculating unit generates the load request and the store request.

5. The data processor according to claim 4,
    wherein the local memory portion has a plurality of access ports, and
    wherein one of the access ports is connected to the external interface portion and is accessed from an outside and the other access ports are connected to the bus switch portion and are accessed from the second calculating unit.

6. The data processor according to claim 5,
    wherein the first calculating unit has a calculator, an input switch for switching an input of an operand to the calculator, a delay regulating unit for regulating a delay between the operands input through the input switch, an output switch for switching an output path of the calculator, a pipeline latch for holding data output through the output switch, and a first calculation control unit for controlling an operation of the first calculating unit in accordance with an instruction sent from the control portion.

7. The data processor according to claim 5,
    wherein the second calculating unit has an address generating unit, a load store control unit for generating the load request and the store request by using an address generated in the address generating unit, and a second calculation control unit for controlling an operation of the second calculating unit in accordance with an instruction sent from the control portion.

8. The data processor according to claim 7,
    wherein the second calculating unit transmits data to the bus switch portion in accordance with a predetermined request format and processes data received in accordance with a predetermined response format.

9. The data processor according to claim 8,
    wherein the bus switch portion has a switch matrix for establishing a connecting path among the second calculating unit, the local memory portion and the external interface portion, and a memory interface for carrying out a conversion between the request format and the response format and an access procedure for the local memory portion.

10. The data processor according to claim 1,
    wherein the external interface portion of the processor block has an access port, and
    wherein the access port is interfaced to outside the data processor.

11. The data processor according to claim 1,
    further comprising a plurality of processor blocks,
    wherein the external interface portion of the processor block has an access port, and the access port of one of the processor blocks is connected to the access ports of the other processor blocks.

12. The data processor according to claim 11,
wherein one of the processor blocks accesses to the local memory portions of the other processor blocks through the access port.

13. A data processor comprising:
a plurality of processor blocks,
wherein the processor block includes a calculating portion having a plurality of calculating units and capable of switching their connecting forms and functions, and a local memory portion,
wherein one of the processor blocks is connected to the other processor blocks, and
wherein a part of the calculating units in the calculating portion generates a load request of a calculation executed by the part of the calculating units to the local memory portion.

14. A data processor comprising:
a plurality of processor blocks,
wherein the processor block includes a calculating portion having a plurality of calculating units and capable of switching their connecting forms and functions, and a local memory portion,
wherein one of the processor blocks can be written to the local memory portions of the other processor blocks, and
wherein a part of the calculating units in the calculating portion generates a load request of an operation operand to the other calculating units and a store request of a result of a calculation executed by the other calculating units.

15. A data processor comprising:
a calculating portion including a plurality of calculating cells for executing a calculation, their logical functions being defined based on configuration data;
a plurality of data memories having a plurality of access ports capable of being operated in parallel and holding calculation data;
a plurality of memory control circuits serving to control access of the corresponding data memory and having a control form defined based on configuration data;
an external interface portion to be connected to the memory control circuit;
a crossbar switch portion connecting the calculating portion to the memory control circuit and having a connecting form defined based on configuration data; and
a control portion for carrying out a control for transferring the configuration data to the calculating cell, the memory control circuit and the crossbar switch portion and controlling their status transition,
wherein the memory control circuit accepts a first access request given from the external interface portion to the data memory and a second access request given from the calculating cell to the data memory and an access response control procedure for responding to the first access request and the second access request is varied based on the configuration data.

16. The data processor according to claim 15,
wherein the memory control circuit executes, as the access response control procedure, a control for accepting the first access request to utilize one of the access ports of the data memory, a control for accepting the second access request to utilize one of the access ports of the data memory, a control for accepting the second access requests which are different in parallel to utilize the access ports which are different from each other, and a control for accepting the first access request to utilize one of the access ports of the data memory and for accepting the second access request to utilize the other access ports of the data memory.

17. The data processor according to claim 16,
wherein the memory control circuit executes such a control as to return a busy state to the external interface portion in response to the first access request when all of the access ports are used in response to the second access request as the access response control procedure which is varied for the corresponding data memory.

18. The data processor according to claim 16,
wherein the memory control circuit executes such a control as to return a busy state to a request source of one of the second access requests in response to the first access request when all of the access ports are used in response to the second access request as the access response control procedure which is varied for the corresponding data memory.

19. The data processor according to claim 18,
wherein the memory control circuit returns a busy state to an access request source to be connected to an access port having low priority in accordance with the priority of the access port in order to select the request source of one of the second access requests for returning the busy state.

20. The data processor according to claim 19,
wherein the priority of the access port is varied in accordance with the configuration data in the memory control circuit.

21. The data processor according to claim 16,
wherein the memory control circuit preferentially accepts any of the first and second access requests which has priority set to be higher when the same access requests conflict with each other.

22. The data processor according to claim 21,
wherein the priority of the first access request and the second access request are set separately for each access port in the memory control circuit.

23. The data processor according to claim 22,
wherein the priority of the first access request and the second access request are varied in accordance with the configuration data in the memory control circuit.

24. A data processor comprising:
an internal bus;
a flexible processor;
a CPU; and
an RAM,
wherein the internal bus is connected to the flexible processor, the CPU and the RAM,
wherein the flexible processor includes
a calculating portion having a plurality of calculating cells for executing a calculation, their logical function being defined based on configuration data;
a plurality of data memories having a plurality of access ports capable of being operated in parallel and holding calculation data;
a plurality of memory control circuits serving to control access of the corresponding data memory and having a control form defined based on configuration data;
an external interface portion connected to the memory control circuit;
a crossbar switch portion connecting the calculating portion to the memory control circuit and having a connecting form defined based on configuration data; and
a control portion for carrying out such a control as to transfer the configuration data to the calculating cell, the memory control circuit and the crossbar switch portion and controlling their status transition, wherein the memory control circuit accepts a first access request given from the external interface portion to the data memory and a second access request given from the calculating cell to the data memory, and an access response control procedure for responding to the first access request and the second access request varied based on the configuration data, wherein the external interface portion is connected to the internal bus, wherein the CPU can execute a program stored in the RAM and transfers data retained in the RAM from the external interface portion to the data memory, and wherein the CPU transfers calculation result data obtained by the flexible processor retained in the data memory from the external interface portion to the RAM.

* * * * *